United States Patent
Senyuk et al.

(10) Patent No.: US 11,747,996 B2
(45) Date of Patent: Sep. 5, 2023

(54) SYSTEM AND METHODS FOR IMPLEMENTING A KEY-VALUE DATA STORE

(71) Applicant: Dropbox, Inc., San Francisco, CA (US)

(72) Inventors: Oleksandr Senyuk, Kirkland, WA (US); James Cowling, San Francisco, CA (US); William Ehlhardt, Seattle, WA (US); Jonathan Lee, Seattle, WA (US); Gevorg Karapetyan, Kirkland, WA (US); Olga Kechina, Kirkland, WA (US); Stas Ilinskiy, Seattle, WA (US)

(73) Assignee: DROPBOX, INC., San Francisco, CA (US)

( * ) Notice: Subject to any disclaimer, the term of this patent is extended or adjusted under 35 U.S.C. 154(b) by 317 days.

(21) Appl. No.: 16/985,234

(22) Filed: Aug. 5, 2020

(65) Prior Publication Data

US 2022/0043585 A1    Feb. 10, 2022

(51) Int. Cl.
*G06F 3/06* (2006.01)
*G06F 1/12* (2006.01)
*G06F 1/10* (2006.01)

(52) U.S. Cl.
CPC .............. *G06F 3/0622* (2013.01); *G06F 1/10* (2013.01); *G06F 1/12* (2013.01); *G06F 3/067* (2013.01);
(Continued)

(58) Field of Classification Search
CPC .................................................. G06F 3/0622
(Continued)

(56) References Cited

U.S. PATENT DOCUMENTS 5,905,874 A * 5/1999 Johnson ................ G06F 13/387
                                                    709/250
6,631,366 B1 * 10/2003 Nagavamsi ......... G06F 16/2455
                                                    707/999.102
(Continued)

FOREIGN PATENT DOCUMENTS

WO      2020055977 A1      3/2020

OTHER PUBLICATIONS

O'Neil P., et al., "The Log-Structured Merge-Tree (LSM-Tree)," to be Published: Acta Informatica, 32 pages.
(Continued)

*Primary Examiner* — Titus Wong
(74) *Attorney, Agent, or Firm* — Fenwick & West LLP

(57) ABSTRACT

One variation of a system for implementing a key-value data store includes one or more processors, storage media and instructions stored in the storage media which, when executed by the system cause the system to: receive a request store a particular key-value item; request a first networked distributed data storage system to store the particular key-value item; based on a determination that a set of one or more offload criteria is satisfied: retrieve a first set of key-value items from the first networked distributed data storage system, and request a second networked distributed data storage system to store the first set of key-value items in a first set of one or more data objects. The first networked distributed data storage system can have a lower data write latency and a higher data storage cost than the second networked distributed data storage system.

18 Claims, 16 Drawing Sheets

(52) U.S. Cl.
CPC .......... *G06F 3/0613* (2013.01); *G06F 3/0653* (2013.01); *G06F 3/0659* (2013.01)

(58) Field of Classification Search
USPC ........................................................ 711/164
See application file for complete search history.

(56) References Cited

U.S. PATENT DOCUMENTS

| | | | | |
|---|---|---|---|---|
| 8,255,660 | B1* | 8/2012 | Chatterjee | G06F 11/1076 |
| | | | | 711/170 |
| 9,817,703 | B1* | 11/2017 | Ryland | G06F 9/52 |
| 2005/0108247 | A1* | 5/2005 | Heinla | H04L 67/101 |
| 2009/0080398 | A1* | 3/2009 | Mahany | H04L 1/0002 |
| | | | | 370/338 |
| 2011/0161293 | A1* | 6/2011 | Vermeulen | G06F 16/184 |
| | | | | 707/E17.112 |
| 2012/0124081 | A1* | 5/2012 | Ebrahimi | G06F 16/214 |
| | | | | 707/769 |
| 2012/0284317 | A1* | 11/2012 | Dalton | G06F 16/14 |
| | | | | 707/827 |
| 2013/0080473 | A1* | 3/2013 | Kuno | G06F 16/278 |
| | | | | 707/802 |
| 2013/0332608 | A1* | 12/2013 | Shiga | G06F 9/5088 |
| | | | | 709/226 |
| 2014/0006458 | A1* | 1/2014 | Hsieh | G06F 16/2329 |
| | | | | 707/803 |
| 2014/0136571 | A1* | 5/2014 | Bonvin | G06F 16/2219 |
| | | | | 707/792 |
| 2014/0156618 | A1* | 6/2014 | Castellano | G06F 16/2308 |
| | | | | 707/703 |
| 2014/0351226 | A1* | 11/2014 | Christodorescu | G06F 16/2455 |
| | | | | 707/769 |
| 2015/0074115 | A1* | 3/2015 | Vasu | G06F 16/27 |
| | | | | 707/741 |
| 2015/0160862 | A1* | 6/2015 | Blott | G06F 3/0683 |
| | | | | 711/148 |
| 2015/0220429 | A1 | 8/2015 | Cypher et al. | |
| 2016/0103702 | A1* | 4/2016 | Schneider | G06F 16/25 |
| | | | | 718/101 |
| 2016/0105503 | A1 | 4/2016 | Zhao et al. | |
| 2018/0107725 | A1 | 4/2018 | Bi et al. | |
| 2019/0361626 | A1 | 11/2019 | East | |
| 2020/0057782 | A1 | 2/2020 | Idreos et al. | |

OTHER PUBLICATIONS

Wikipedia, "Log-Structured Merge-Tree," last updated: Jan. 11, 2020, retrieved from: https://en.wikipedia.org/wiki/Log-structured_merge-tree on Mar. 10, 2020, 2 pages.

* cited by examiner

SYSTEM AND METHODS FOR IMPLEMENTING A KEY-VALUE DATA STORE

TECHNICAL FIELD

The following description relates generally to computer-implemented key-value datastores and more specifically to a new and useful systems and methods for implementing a key-value data store.

BACKGROUND

A large-scale online service operates applications that provide services to many end-users over a data communications network (e.g., the Internet). As part of large-scale online service operation, centralized network logging services are used to receive and store information provided by the applications. This "log" information is then processed (e.g., aggregated) by the online service provider for analytics or for other purposes such as, for example, for improving the services provided by the applications for end-users.

Given the large number of end-users that the online service may support, the volume of log information provided by applications may be continuous and immense. Implementing a cost-effective and performant logging service that can scale up to the large volume of log information that results from the large end-user base using the applications of the online service is a technical challenge.

On-premises and cloud-based logging services exist. However, an on-premises implementation can have many computing nodes (e.g., servers) in a computing cluster. These many computing nodes come with the associated maintenance overhead and technical challenges ensuring cluster reliability, failover, replication, etc. On-premises solutions also require the online service provider to outlay the expense of implementation and maintenance. In a worst case, the reliability design is flawed, and data may be irrevocably lost.

Cloud-based solutions avoid some of the expenses associated with on-premises implementations, such as maintenance and reliability design costs. However, cloud-based solutions have their own costs, such as charge-per-access and charge-per-unit of data stored. For example, a solid-state drive-based cloud-based data store that charges based on the amount of data stored may be cost prohibitive for storing large amounts of data.

Disclosed embodiments address these and other issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
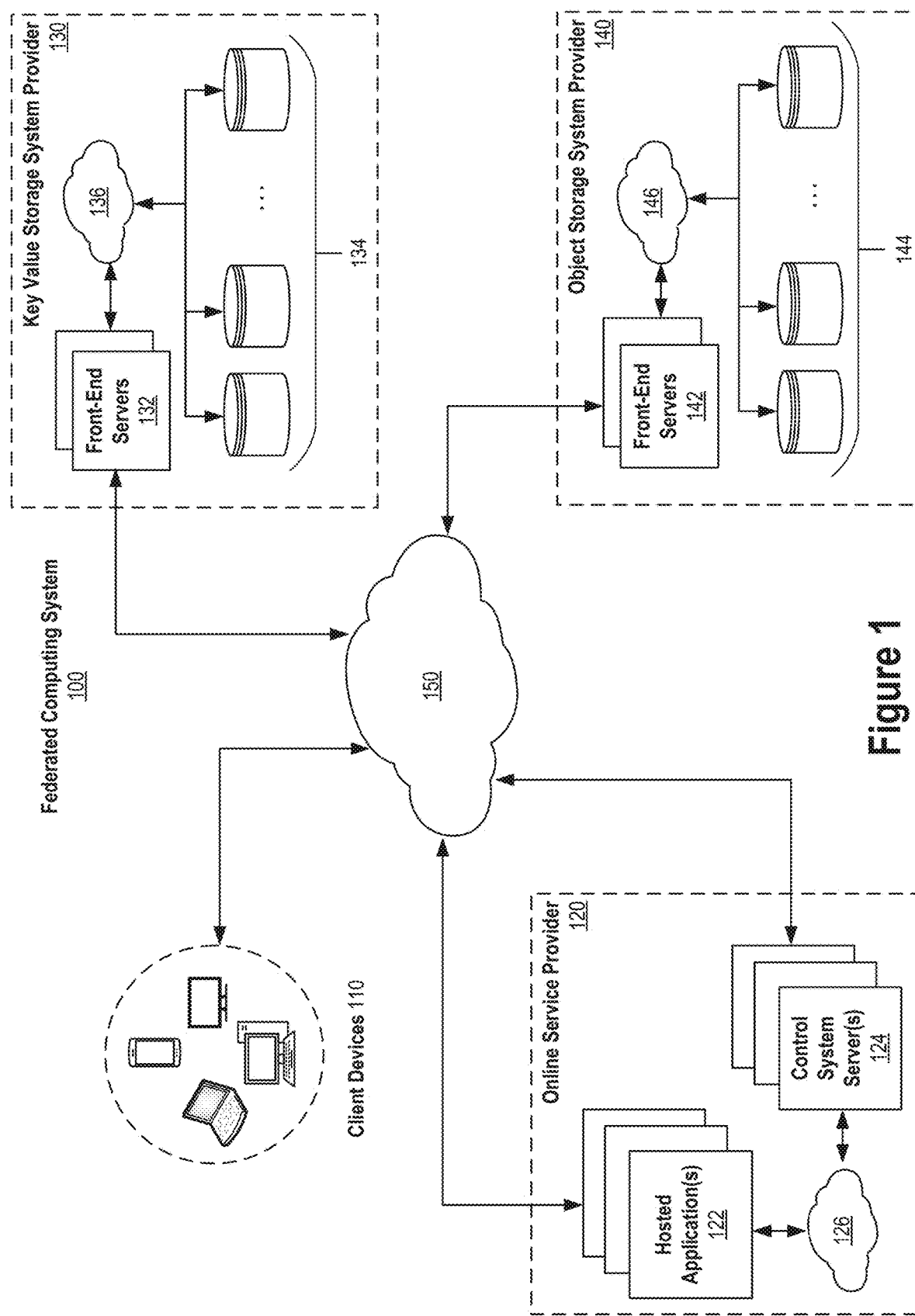
FIG. 1 illustrates an example federated computing system that contains a control system for implementing a key-value datastore using multiple networked distributed data storage systems, according to some embodiments.

In the following description, for the purposes of explanation, numerous specific details are set forth in order to provide a thorough understanding of embodiments of the invention. It will be apparent, however, that the embodiments may be practiced without these specific details. In other instances, well-known structures and devices are shown in block diagram form in order to avoid unnecessarily obscuring the understanding of the embodiments.

General Overview

Computing systems and associated methods for implementing a key-value datastore using one or more networked distributed data storage systems are disclosed. The key-value datastore may be implemented as a multi-level index that provides access to write-intensive data that is inserted into the key-value datastore at a relatively high rate and less occasionally read from the key-value datastore. The write-intensive data may be, for example, logging information provided by one or more applications of a large-scale online service.

The multi-level index may be organized as multiple "runs" of key-value items where each run logically contains a set of ordered key-value items corresponding to a respective period of time. The runs may be organized into multiple levels based on the time when key-value items are inserted into the multi-level index such that a key-value item in a lower level of the multi-level index may be more recently inserted into the key-value datastore than a key-value item in a higher level of the multi-level index.

The lowest level of the multi-level index is sometimes referred to herein as "Level 0." Higher levels of the multi-level index are sometimes collectively referred to herein as "Level 1+". Individual levels of the multi-level index are sometimes referred to herein as "Level X" where X is an integer greater than or equal to zero.

Runs at lower levels of the multi-level index may correspond to shorter periods of time and runs at higher levels of the multi-level index may correspond to longer periods of time. For example, different runs at Level 0 may correspond to different days, different runs at Level 1 may correspond to different multi-day periods and different runs at Level 2 may correspond to different weeks, and so on.

Level 0 of the multi-level index may be provided using a networked distributed data storage system having relatively low average data access latency times (but possibly relatively low data storage capacity) sometimes referred to herein as the "Key-Value Storage System" and Level 1+ may be provided using a networked distributed data storage system having relatively high average data access latency times (but possibly relatively high data storage capacity) sometimes referred to herein as the "Object Storage System." The term "data access" encompasses both writing data to the key-value datastore and reading data from the key-value datastore.

The multi-level index can exploit the relatively low average data access latency times of the Key-Value Storage System for accessing newer key-value items and the potentially relatively greater data storage capacity of the Object Storage System for storing and accessing older key-value items. As a result, a relatively high-volume stream of new key-value items can be quickly inserted into the key-value datastore. In addition, read patterns where newer key-value items are read from the key-value datastore more frequently than older key-value items are efficiently supported because newer key-value items that are accessed more frequently are stored in the Key-Value Storage System having relatively low average data access latency times.

In some related embodiments, the Key-Value Storage System and the Object Storage System are implemented using cloud-based distributed data storage systems in which design and maintenance of these systems is primarily the responsibility of one or more other application service providers and not primarily the responsibility of online service provider implementing the key-value datastore. Instead, the online service provider can use these systems as a service—possibly including paying service charges to the other service provider(s)—to implement the key-value datastore. In this way, a federated computing system is realized where the responsibility on the service provider implementing the key-value datastore to design and maintain online distributed computing systems that meet scalability, data redundancy (e.g., data replication strategies), system uptime and other service level requirements for the Key-Value Storage System and the Object Storage System is reduced or eliminated.

In some related embodiments, a control system of the online service performs a method implementing a key-value datastore. The method includes the control system receiving requests from hosted applications of the online service to insert key-value items into the key-value datastore and, in turn, requesting the Key-Value Storage System to insert the key-value items into the Key-Value Storage System. The method further includes the control system periodically determining that one or more offload criteria are satisfied. Based on such a determination, the control system retrieves a set of key-value items from the Key-Value Storage System and requests the Object Storage System to store the set of key-value items in one or more data objects of the Object Storage System. In this way, older key-value items stored in the Key-Value Storage System are continuously and periodically migrated to the Object Storage System to free data storage space in the Key-Value Storage System for new key-value items.

In some related embodiments, for horizontal scalability, the control system encompasses multiple servers any one of which can accept a request to insert a key-value item from an application of the online service. When requesting the Key-Value Storage System to insert a key-value item, a server of the control system may generate an ordering stamp based on a current system time of system clock of the server and add the generated ordering stamp to the key of the key-value item. The control system then requests the Key-Value Storage System to insert the key-value item with the added ordering stamp to the key-value datastore. The ordering stamps added to the keys of the key-value items provide an ordering of the key-value items based on the system clocks of the servers of the control system. A time service is used to keep the system clocks of the servers synchronized within a threshold clock skew.

In some related embodiments, the control system is tolerant to failures of the Key-Value Storage System when requesting to insert a key-value item. The control system times out a request to insert a key-value item into the Key-Value Storage System that has not successfully completed within a threshold amount of time (e.g., a few seconds). In the event the insert request is timed out, the server of the control system generates a new ordering stamp based on the then current system time of the system clock of the server and retries the insert request with the new ordering stamp. This is repeated until the insert request is successful or aborted after a threshold number of unsuccessful attempts. By doing so, a stable ordering of the key-value items inserted into the Key-Value Storage System is realized. Because of the stable ordering, a key-value item inserted into the Key-Value Storage System has an ordering stamp that is within a small period of time of the time at which the key-value item is actually inserted into the Key-Value Storage System. Beneficially, the control system does not need to acquire or release or otherwise manage locks or other synchronization primitives to achieve this stable ordering. Further, the stable ordering provides an upper bound corresponding to the insert time out period on the newest key-value items that might have been missed during a read from the Key-Value Storage System.

In some related embodiments, the one or more offload criteria includes a time interval and a set of key-value items is regularly offloaded from the Key-Value Storage System to the Block Storage System on the time interval. For example, once a day, the control system can retrieve the oldest run of key-value items stored in the Key-Value Storage System and store the run in one or more data objects of the Object Storage System. The oldest run in the Key-Value Storage System can then be deleted, or garbage collected, to free data storage space in the Key-Value Storage System for new runs.

In some related embodiments, one or more indices of data objects stored in the Object Storage System containing key-value items offloaded to the Object Storage System is maintained in the Key-Value Storage System. In one such index, referred to herein as a "time range" index, a data block containing a set of key-value items is associated in the time range index with a time range having a start time and an end time. The start time of the time range corresponds to the oldest (least recent) ordering stamp in the set of key-value items and the end time of the time range corresponds to the newest (most recent) ordering stamp in the set of key-value items.

In some related embodiments, the time range index is used by the control system for data object pruning. In particular, for a read operation received by the control system requesting one or more key-value items from the key-value datastore based on their ordering stamps, the control system can access the time range index to identify a subset of all data objects stored in the Object Storage System that may contain key-value items relevant to the read operation. The control system may request the Object Storage System to scan or otherwise access just those subset of data objects as opposed to requesting the Object Storage System to scan or otherwise accessing all data objects stored in the Object Storage System, thereby improving the efficiency (e.g., latency) of the read operation.

In another index, also referred to herein as a "statistical" index, a data block containing a set of ordered key-value items is associated with one or more key ranges derived from the set of ordered key-value items. Each key range has a start key and an end key defining a respective subset of ordered key-value items of the set of ordered key-value items of the data block. Such a subset is sometimes referred to herein as a "key range zone." Each such key range zone is associated in the statistical index with a minimum field value and a maximum field value. The minimum field value is the minimum value for a field of the values among all key-value items that belong to the subset. The maximum field value is the maximum value for the field among all key-value items that belong to the subset.

In some related embodiments, the statistical index is used by the control system for key range zone pruning. In particular, for a query received by the control system requesting key-value items having values that satisfy a filter on a field of the values, the control system can use the statistical index to identify key range zones that cannot possibly contain key-value items that satisfy the query. These key range zones can be skipped (pruned) when requesting the Object Storage System to scan or otherwise access other key-value items to identify key-value items that satisfy the query, thereby reducing query processing time.

These and other embodiments will now be described with respect to the drawings.

Federated Computing System

FIG. 1 illustrates example federated computing system 100 that contains control system 124 for implementing a key-value data store using Key-Value Data Storage System 134 and Object Storage System 144, according to some embodiments.

The term "networked" refers to a system configuration involving multiple computing devices in which the multiple computing devices interact via a data communications network according to one or more network communications protocols, as opposed to via an intra-computing process communication mechanism or an inter-computing process communication within a single computing device. The one or more network communications protocols may include, for example, any protocol based on the Internet Protocol (IP) Protocol, such as the Hyper Text Transfer Protocol (HTTP) or the Secure Hyper Text Transfer Protocol (HTTPS).

The term "distributed" refers to a system configuration in which multiple computing devices are used to provide a common function such as data storage or an application service.

The term "data communications network" refers to electric, electromagnetic or optical means for carrying digital data streams between computing devices. A data communications network may be composed of multiple data communications networks including possibly different types of data communications networks including, for example, two or more of: the Internet, a Local area Network (LAN), a Wide Area Network (WAN), the Published Switched Telephone Network (PSTN), a wireless network (e.g., an IEEE 802.11 network), a cellular network (e.g., GSM, LTE, etc.) or a satellite network.

In this example, there are two networked distributed data storage systems 134 and 144 where system 134 is used for Level 0 of the multi-level index and system 144 is used for Level 1+ of the multi-level index. While just two networked distributed data storage systems can be used in some embodiments, in other embodiments more than two networked distributed data storage systems can be used instead. For example, one networked distributed data storage system (e.g., 134) can be used to implement Level 0 of the multi-level index, a second networked distributed data storage system (e.g., 144) can be used to implement Level 1 of the multi-level index, and a third networked distributed data storage system (not shown) can be used to implement Level 2+ of the multi-level index.

It is also possible to use a single networked distributed data storage system for all levels of the multi-level index. For example, a single networked distributed data storage could provide two or more of: a first storage level based on volatile memory devices having relatively low average data access latency times for in-memory data storage (possibly backed by write ahead log stored in non-volatile memory for data redundancy purposes), a second storage level based on solid-state storage devices (SSDs) having higher average data access latency times than volatile memory devices, and a third storage level based on hard (magnetic) disk drives having higher average data access latency times than SSDs. In this example, Level 0 of the multi-level index might be implemented by using the first or second storage level and Level 1+ of the multi-level index might be implemented by using the second or third storage level.

In the example of FIG. 1, Key-Value Storage System 134 is provided by key-value storage system provider 130, and Object Storage System 144 is provided by object storage system provider 140. Providers 130 and 140 can be the same or different providers. In one example implementation, Key-Value Storage System 134 can be the DYNAMODB service provided by AMAZON.COM of Seattle, Wash. and Object Storage System 144 can be the Simple Storage Service (S3) also provided by AMAZON.COM.

In some related embodiments, Key-Value Storage System 134 in cooperation with front-end servers 132 and data communications network 136 provide a database service over data communications network 150 to control system 124 and potentially other systems. The database service supports key-value structures and related operations such as Put, Get, Update and Delete operations on key-value items among other possibly supported key-value operations.

Key-Value Storage System 134 may organize key-value items into tables. A table may be partitioned into multiple partitions by a partition key. The partition key may be a field of the keys of the key-values items inserted into the table.

Key-Value Storage System 134 may be configured to guarantee each table partition a portion of the computing resources allocated to System 134. For example, a table partition may be allowed to store up to ten GigaBytes (GB) of data and handle up to 1,000 write capacity units (WCU) and 2,000 read capacity units (RCU). One RCU might represent, for example, one strongly consistent read per second or two eventually consistent reads per second for key-value items up to 4 KiloBytes (KB) in size. One WCU might represent, for example, one write per second for a key-value item up to 1 KB in size.

Within a partition of a table of the Key-Value Storage System, a set of key-value items can be ordered according to a sort key. The sort key may be based on one or more fields of the keys of the key-value items in the set.

Key-Value Item

Figure 2:
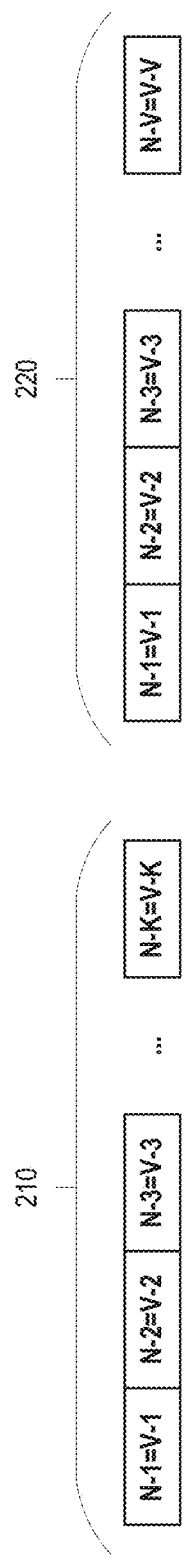
FIG. 2 depicts an example key-value item, according to some embodiments.

Turning briefly to FIG. 2, it illustrates the general structure of an example key-value item. Both key 210 and value 220 of the key-value item may each composed of one or more fields. A key-value item may be viewed as like a row of a database table where the fields are like the columns of the row and the values in the fields of the key and value are like the values in the columns of the row. A key-value item may also be viewed as a mapping from the key to the value. More particularly, a mapping from the value(s) of the field(s) of the key to the value(s) of the field(s) of the value.

Each field of a key-value item may have a field name (e.g., a string value encoded as a byte sequence) and an associated field value (e.g., a string value, a number value or a binary value encoded as a byte sequence). In this example, there are K number of fields of key 210 and V number of fields of value 220. The number of fields K of key 210 and the number of fields V of value 200 can be the same or different. While a field of key 210 or value 200 can include the field name of the field, the field name can be coded in the field (e.g., dictionary coded) or implied (e.g., based on the order of the field values of key 210 or value 220.)

As mentioned, from the perspective of Key-Value Storage System 134, the key of a key-value item can have a partition key and a sort key. In particular, one or more fields of the key can be the partition key and one or more fields of the key can be the sort key.

Figure 3:
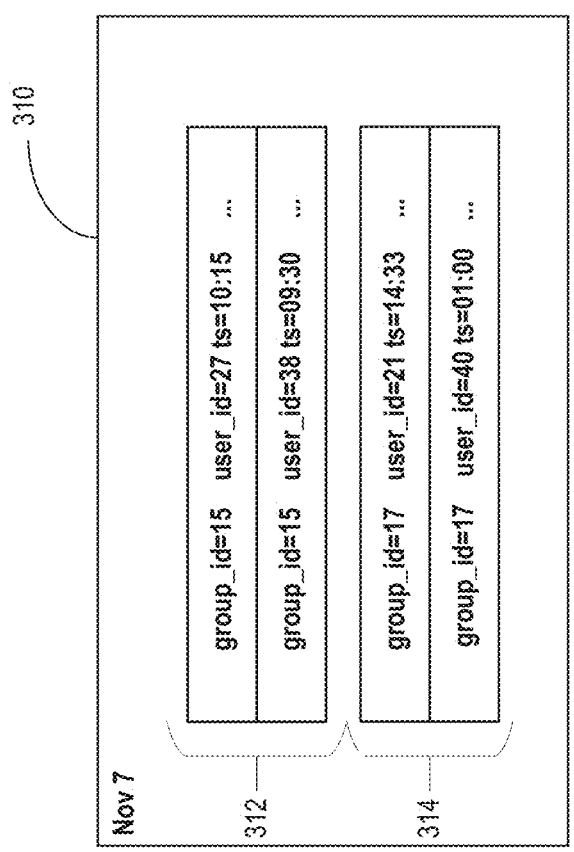
FIG. 3 depicts an example partitioned table of a networked distributed data storage system storing a run of key-value items, according to some embodiments.

In some embodiments, a partitioned table in Key-Value Storage System 134 contains a run of key-value items corresponding to a period of time. For example, FIG. 3 depicts partitioned table 310 of Key-Value Storage System 134 storing a run of key-value items for "Nov 7" (November $7^{th}$), according to some embodiments. In this simple example, there are only two partitions 312 and 314 and only four key-value items. However, a practical implementation may have many more partitions and many more key-value items.

A table of Key-Value Storage System 134 can be partitioned into multiple partitions based on a one or more particular fields of the keys of the key-value items in the run contained by the table (collectively referred to herein as the "partition key" of the table). For example, for table 310, the partition key is the "group_id" field. As a result, the key-value items having the value of "15" of the "group_id" field are stored in partition 312 and the key-value items having the value of "17" of the "group_id" field are stored in partition 314.

Within each table partition, the key-value items within the partition can be ordered by one or more particular fields of the keys of the key-value items (collectively referred to herein as the "sort key" of the table). In some embodiments, the ordering stamp added by control system 124 to the keys of key-value items inserted into Key-Value Storage System 134 is one of the fields of the sort key. However, a sort key can have just the ordering stamp field as the sort key or have one or more fields in addition to the ordering stamp field as the sort key.

In embodiments where the ordering stamp includes two parts: (1) a timestamp and (2) a server identifier as described below in the "ORDERING STAMPS" section, then the ordering stamp field can actually be two fields: (1) a timestamp field, and (2) the server identifier field. In these embodiments, the sort key can include both of these fields. Thus, reference herein to an ordering stamp field encompasses both possible implementations of the ordering stamp field in which one implementation is where the ordering stamp field is a single timestamp field of the sort key, and the other possible implementation of the ordering stamp field is a combination of a timestamp field and a server identifier field of the sort key.

For example, for table 310, the sort key includes the "user_id" field and the "ts" field. Here, "ts" is the name given to the ordering stamp field, but other names could be used according to the requirements of the particular implementation at hand and no particular name of the ordering stamp field is required. Accordingly, within partition 310, key-value items are first ordered by the values of the "user_id" field in increasing order, then ordered by the values of the "ts" field in increasing order. Likewise, for the key-value items in partition 320. In embodiments where the "ts" field is actually composed of a timestamp and a server identifier field, then key-value items are first ordered by the values of the "user_id" field in increasing order, then ordered by the values of the timestamp field in increasing order, and finally ordered the values of server identifier field in increasing order.

Control system 124 can encompass a networked computing system of one or more computing devices (servers) that offers a request-response interface to hosted applications 122 for performing various operations on key-value items. The various operations that the interface of control system 124 may allow hosted applications 122 to perform on key-value items may include all of the following operations, a superset of these operations, or a subset thereof: putting (inserting) a key-value item, updating a key-value item, getting (reading) a key-value item, deleting a key-value item, querying for key-value items and scanning for key-value items.

From the perspective of hosted applications 122, putting a key-value item can encompass creating a new key-value item or replacing an existing key-value item in the key-value data store.

Updating a key-value can encompass replacing (editing) selected field(s) of an existing key-value item's value or adding a new key-value item.

Getting a key-value item can return all or selected field(s) of the value of an existing key-value item.

Deleting a key-value item can encompass deleting an existing key-value item.

Querying for key-value items can return key-value items selected based on one or more field(s) of the key or the value.

Scanning for key-value items can return filtered key-values items from among a set of key-value items that are selected to be evaluated against the filter.

The request-response interface of control system 124 offered to hosted applications 122 may be invocable over data communications network 126 according to an application-layer networking protocol such as, for example, the hypertext transfer protocol (HTTP), the secure hypertext transfer protocol (HTTPS), or the like. Requests to perform key-value operations as well as responses thereto can be formatted (packaged) in a data serialization format for transport according to the application-layer networking protocol. Such data serialization format might include, for example, JavaScript Object Notation (JSON) format, eXtensible markup language (XML) format, or the like. However, no particular application-layer networking protocol or data serialization format is required and any networking protocol or data serialization format suitable for the requirements of the particular implementation at hand may be used.

While in some embodiments, control system 124 offers a request-response interface to hosted applications 122 over network 126 by which hosted applications 122 can request control system 124 to insert key-value items into the key-value datastore, control system 124 subscribes to one or more streams of key-value items that are published by hosted applications 122 using a publish-subscription computing system (not shown) connected to network 126 in other embodiments. In these embodiments, control system 124 may receive key-value items to insert into the key-value datastore from the publish-subscription system over network 126 where the key-value items are published to the publish-subscription system by hosted applications 122 via network 126. In this case, control system 124 may still offer a request-response interface to hosted applications 122 for other key-value operations such as reading and querying for key-value items. Given the large volume of key-value items being inserted into the key-value datastore, use of a publish-subscription system for asynchronous messaging of key-value items from hosted applications 122 to control system 124 can be more scalable than a synchronous request-response interface. The publish-subscription system can be implemented as a distributed commit log, for example, using APACHE KAFKA or the like.

Client devices 110 can include end-user computing devices such as smart phone devices and other handheld personal computing devices, laptop computers, desktop computers, home appliances and other Internet-of-Things (IoT) devices that are capable of interacting with hosted applications 122 via data communications network 150. Client devices 110 are not limited to end-user computing devices and may include other types of computing devices such as, for example, server computing devices co-located in computer hosting facilities. Another example of a client device 110 is described below with respect to FIG. 14.

Interaction between hosted applications 122 and client devices 110 may encompass network communications sent and received via network 150. Network 150 may be the Internet or other data communications network. In providing application services to client devices 110 such as, for example, when responding to network requests from client devices 110, or while otherwise providing applications services to end-users or client devices 110, hosted applications 122 may request control system 124 to perform various operations on key-value items such as those mentioned above. For example, hosted applications 122 may use control system 124 as an auditing service or for other relatively high insert workload over an extended period of time.

No particular hosted applications 122 and no particular type of online service is required. In one example implementation, online service provider 120 provides content management services or collaborative content management services. An example content management 1300 and example collaborative content management system 1330 are described below with respect to FIGS. 13-16. Hosted applications 122 that generate key-value items to be stored in the key-value datastore can encompass at least some or at least all of: communications interface 1500, user interface module 1502, account management module 1504, authenticator module 1506, content item management module 1508, sharing module 1510, synchronization module 1512, conflict management module 1514, mail server module 1522, proxy server 1602, CCI editor 1604, backend server 1606, provider module 1610, copy generator 1612, CCI differentiator 1614, settings and security module 1616, metadata module 1618, CCI revision module 1620, and notification server 1622.

In some related embodiments, Object Storage System 144 in cooperation with front-end servers 142 and data communications network 146 provide an object storage service over data communications network 150 to control system 124 and potentially other systems. System 144 may store data objects organized into "buckets." A bucket may be viewed as a logical container of data objects within system 144. Each data object stored in a bucket may have an identifier that uniquely identifies the data object within the bucket.

While in some embodiments control system 124 is part of a federated computing system where one or both of Key-Value Storage System 134 and Object Storage System 144 are provided by a service provider that is not the online service provider of hosted applications 122, control system 124, Key-Value Storage System 134 and hosted applications 122 are all operated by the same online service provider in other embodiments. Thus, a federated computing system involving multiple different online service providers is not required but is described to illustrate a possible implementation.

Ordering Stamps

Figure 4:
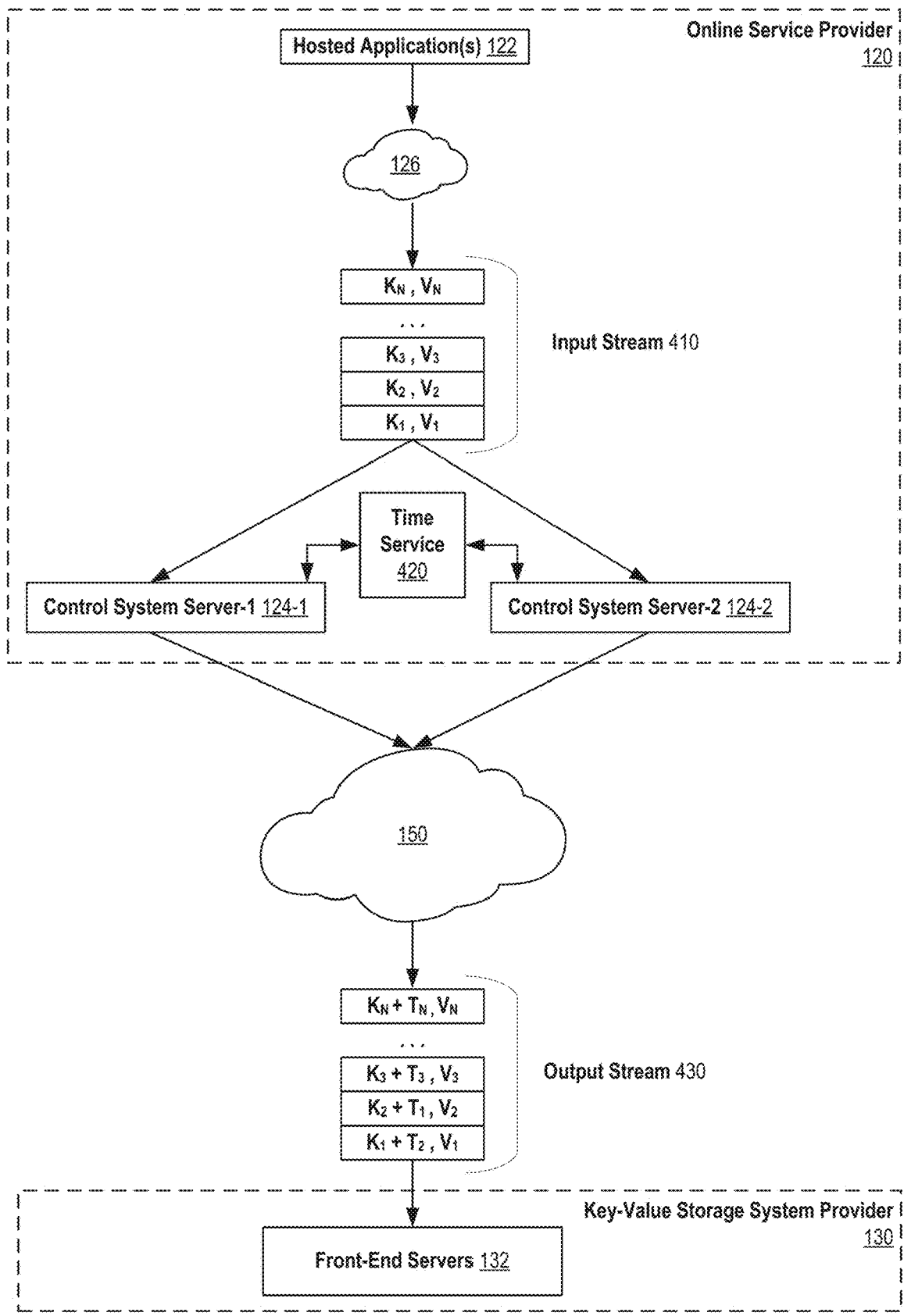
FIG. 4 depicts an example of stable ordering of key-value items, according to some embodiments.

FIG. 4 illustrates an example of ordering stamps, according to some embodiments. Hosted applications 122 provide a stream 410 of key-value items to control system 124 via data communications network 126. Control system 124 has multiple servers for horizontal scalability. In this example, there are two servers but there could be more than two servers used according to the scalability requirements of the particular implementation at hand.

Before a control system server (e.g., 124-1) attempts to insert a key-value item from input stream 410 into Key-Value Storage System 134, the server may add an ordering stamp to the key of the key-value item. The ordering stamp is used as, or as part of, the sort key to order key-value items within runs based on time.

The server may obtain the ordering stamp based on a system clock of the server. The system clock may maintain a system time that represents the server's notion of the passage of time including the passing of days on a calendar. For example, the system time may in the form of a number of time units that have elapsed since an epoch (e.g., a number of milliseconds since Jan. 1, 1970 00:00:00 UTC). The server may generate an ordering stamp from a current system time of the system clock. Here, "current" refers to the value of the system clock when the then system time is obtained from the system clock. The initialism "UTC" stands for Coordinated Universal Time, a time standard by which the world regulates clock and time.

The ordering stamp added to a key-value item can be the entire current system time value, or a portion thereof. In particular, the portion of the current system time relative to the time period of a run can be used as the ordering stamp as it is sufficient to order the key-value items based on time using a combination of the time period of the run and the ordering stamps of the key-value items. For example, if a run is for the current day, then the portion of the system time representing the number of time units since the start of the current day (e.g., number of milliseconds since 00:00:00 UTC on the current day) can be used as the ordering stamp instead of using the entire current system time. Using only a portion of the current system time the ordering stamp can save data storage space.

A benefit of using the system clock for the ordering stamp is that the server need not communicate with other servers of control system 124 in order to generate the ordering stamp. This reduces network communication between the servers conserving network bandwidth and reduces the chance of failure due to lack of availability of one or more servers of control system 124.

Time service 420 may be used to keep the respective system clocks of the servers of control system 124 within a clock skew threshold (e.g., twenty milliseconds) of one another. For example, time service 420 may be based on the network time protocol (NTP) or the like.

Keeping the system clocks synchronized using time service 420 is useful to provide a stable ordering key-value items based on time and prevent the ordering stamps from not reflecting an advance of time (within the tolerance of the clock skew threshold). For example, it would be undesirable for a first server of the control system 124 to generate an ordering stamp for a first key-value item received from a hosted application that was substantially before in time than the time the key-value item is obtained by the first server and where a second server of the control system 124 generates an ordering stamp for a second key-value item received from the hosted application where the ordering stamp generated for the second key-value item is more recent than the ordering stamp generated for the first key-value item, even though the hosted application sent the second key-value item well before sending the first key-value item. This would be undesirable because, for example, a read for key-value items from the key-value datastore having ordering stamps later than a time the first key-value item was sent by the hosted application may not return the first key-value item.

Control system 124 may output stream 430 of key-value items corresponding to input stream 410. In particular, servers of control system 124 may output stream 430 for transmission via network 150 to front-end servers 132 for insertion into Key-Value Storage System 134. Each of the key-value items of output stream 430 may include the ordering stamps added to the key-value items by control system 124.

In some embodiments, depending on the capabilities of the system clocks at the servers of control system 124, an ordering stamp has a nanosecond time resolution which provides more fine grained time resolution than a millisecond time resolution thereby reducing the probability of two servers having the exact same ordering stamp for key-value items.

However, even with nanosecond time resolution it is possible for key-value items to be assigned the same ordering stamps at the same server of control system 124. It is also possible for key-value items to be assigned the same ordering stamps different servers of control server 124.

For the same server case, it can be guaranteed that the same ordering stamps are not assigned to key-value items by tracking the last timestamp assigned and never assigning a timestamp that is less than or equal to the last timestamp. This approach ensures that ordering stamps at a single server of control server 124 are strictly increasing. For example, this approach may be implemented by the following pseudo-code:

timestamp=max(time.now( ),last_assigned_timestamp+1))

For the different servers case, an ordering stamp may be composed of two parts: (1) a millisecond or a nanosecond time resolution timestamp, and (2) a unique server identifier. The timestamp may be generated in a strictly increasing manner as in the same server case above. The unique server identifier may be a small integer value assigned to each server of control system 124. The combination of server-unique timestamp and server identifier ensures that no two ordering stamps issued by the servers of control system 124 are identical. In some embodiments, each server of control system 124 independently obtains its unique server identifier from object storage system 144 or other centralized database at server startup or initialization, stores the assigned unique server identifier in volatile memory of the server, and uses that server identifier data stored in the volatile memory when assigning ordering stamps to key-value items. If the server fails or crashes, the server can simply re-obtain the assigned server identifier again from object storage system 144 or other centralized database system without having to coordinate with the other servers of control system 124.

In some embodiments, the timestamp portion of an ordering stamp is 64 bits and the unique server identifier portion is 8 or less bits for a total bit width for ordering stamps of 72 bits or less. This saves significant data storage space over using 128-bit globally unique identifiers (GUIDs) for ordering timestamps especially considering the large number of key-value items involved.

Insert Time Out

Inserting a key-value item into Key-Value Storage System 134 may fail for various reasons. For example, a server of front-end servers 132 or a node of Key-Value Storage System 134 may fail, or front-end servers 132 or Key-Value Storage System 134 may become overloaded with requests. The result is control system 124 may not receive confirmation from front-end servers 132 that a key-value item was successfully inserted into Key-Value Storage System 134.

In a degenerative non-failure case, a request by control system 124 to insert a key-value item into Key-Value Storage System 134 eventually succeeds well after the time of the ordering stamp added to the key-value item. This can be problematic because (a) the time the key-value item is stored in the Key-Value Storage System is well after (b) the time of the ordering stamp added to the key-value item. The difference between these two times (a) and (b) is sometimes referred to herein as the "insert latency." In most cases, the insert latency may be relatively small (e.g., less than a few seconds). However, if the insert latency for a key-value item is relatively large (e.g., minutes, hours or more), then a read or query for key-value items recently inserted into the key-value datastore according to their ordering stamps may miss recently inserted key-value items that had a relatively high insert latency because their ordering stamps are much older than the actual time the key-value items were inserted into the Key-Value Storage System 134.

To prevent a key-value item inserted into Key-Value Storage System 134 from having a relatively high insert latency (e.g., greater than five seconds) and to provide an upper bound on the insert latency for a key-value item, a server of control system 124 may time out (abort) a request to insert a key-value item into Key-Value Storage System 134 if the request has not succeeded within a threshold amount of time. For example, the server may abort the request if the server has not received via network 150 confirmation from front-end servers 132 that the request was successfully processed within the threshold amount of time of the ordering stamp added to the key-value item or within the threshold amount of time of a time at which the insert request was initiated.

Stable Ordering Method

Figure 5:
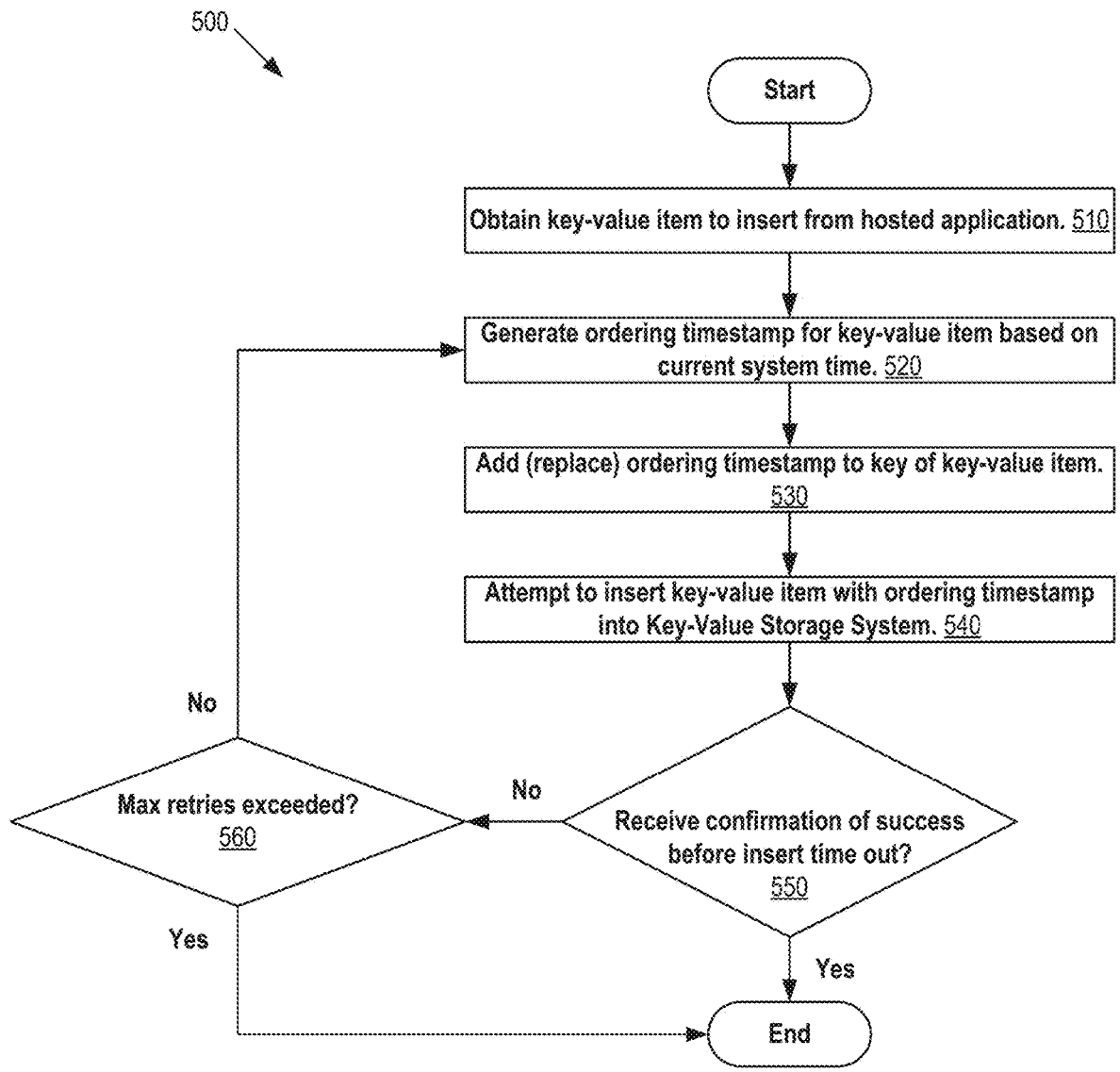
FIG. 5 is a flowchart of an example method for stable ordering of key-value items, according to some embodiments.

FIG. 5 is a flowchart 500 of an example method performed by a server of control system 124 for stable ordering, according to some embodiments.

At block 510, the server obtains a key-value item to insert into the key-value datastore from a hosted application (e.g., one of hosted applications 122). The server can obtain the key-value item in various way including, for example, in a request from the hosted application or via a publish-subscription computing system.

At block 520, the server generates an ordering stamp for the key-value item. To do this, the server obtains a current system time from a system clock of the server. The current system time is used to generate the ordering stamp. The entire current system time value (e.g., number of milliseconds since an epoch) can be used as the ordering stamp, or a portion of the current system time value relative to the time period of the current run can be used as the ordering stamp (e.g., number of milliseconds since the start of the current day UTC).

At block 530, the server adds the ordering stamp to the key of the key-value item.

At block 540, the server attempts to insert the key-value item with the ordering stamp added to the key into the Key-Value Storage System 134. For this, the server may send a request via network 150 to insert or put the key-value item with the ordering stamp added to front-end servers 132. The server of control system 124 may start a timer at the commencement of the attempt. The timer may be set to expire within a threshold period of time (e.g., within a few seconds). The length of the threshold period of time may be selected according to the requirements of the particular implementation at hand based on such factors as, for example, minimizing the insert latency and the average data access latency of the Key-Value Storage System 134 for successful inserts.

At decision 550, if, before expiration of the timer, the server of control system 124 receives confirmation from front-end severs 132 via network 150 that the insert request was successful, then the method ends. On the other hand, if the timer expires before the server receives such confirmation, then, at block 560, the server determines if a predetermined maximum number of retries has been exceeded (e.g., three retries). If the maximum number of retries has not been exceeded, then a new ordering stamp is generated based on the then current system time at the server, the new ordering stamp replaces 530 the previous ordering stamp in the key of the key-value item, and the insert is attempted 540 again, this time with the new ordering stamp. On the other hand, if the maximum number of retries has been exceeded, then the method ends. In this case, the hosted application may be notified via network 126 that the insert was not successful.

By performing the method of flowchart 500, the server of control system 124 provides an upper bound on the insert latency for the key-value item corresponding to the length of the insert time out.

Returning now to FIG. 4, when servers of control system 123 perform the method of flowchart 500 of FIG. 5, it is possible for the key-value items in output stream 430 to be ordered in order of their ordering stamps differently than order in which the key-value items are obtained by control system 124. For example, in the example of FIG. 4, key-value item $K_1$, $V_1$ has an ordering stamp $T_2$ that is more recent in time than ordering stamp $T_1$ for key-value $K_2$, $V_2$ even though key-value item $K_1$, $V_1$ was received at control system 124 before key-value item $K_2$, $V_2$ was received at control system 124. This could be because: (a) ordering stamp $T_2$ was generated for key-value item $K_1$, $V_1$ at a different server of control system 124 from the server where timestamp $T_1$ was generated for key-value item $K_2$, $V_2$, (b) key-value item $K_1$, $V_1$ was received at a server only slightly before key-value item $K_2$, $V_2$ was received at a server, and (c) the system clock of the server at which key-value item $K_1$, $V_1$ was received was slightly ahead of the system clock of the server at which key-value item $K_2$, $V_2$ was received within the clock skew threshold. Alternatively, timestamp $T_2$ could be a subsequent ordering stamp generated for key value item $K_1$, $V_1$ according to the method of flowchart 500 of FIG. 5 after one or more attempts to insert key value item $K_1$, $V_1$ into Key-Value Storage System 134 timed out. In this later case, not only would timestamp $T_2$ for key-value item $K_1$, $V_1$ be more recent than timestamp $T_1$ for key-value item $K_2$, $V_2$, but key-value item $K_1$, $V_1$ would also appear in output stream 430 after key-value item $K_2$, $V_2$ from the perspective of front-end servers 132.

Sorted Runs

Figure 6:
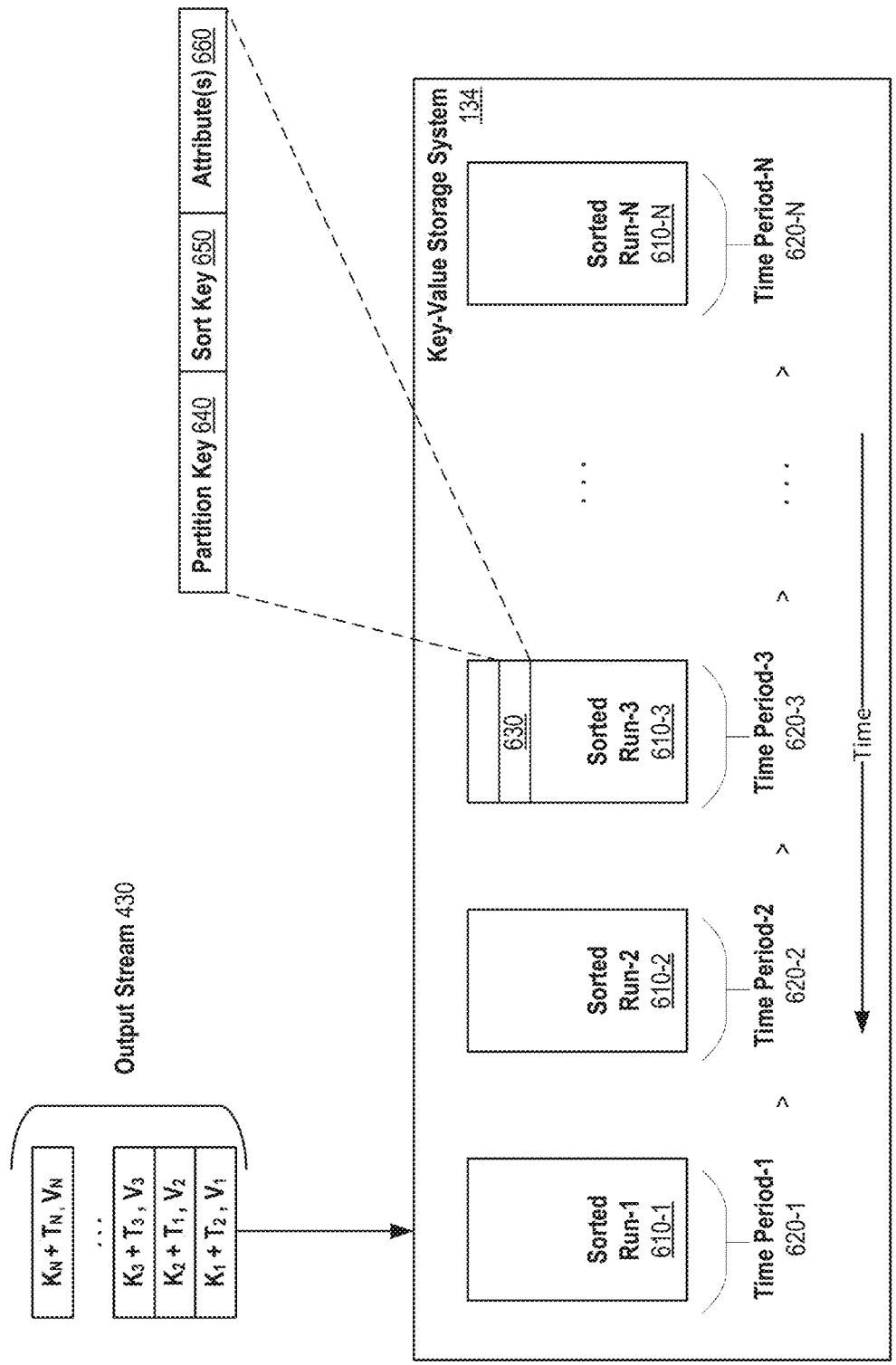
FIG. 6 depicts an example of storing runs of sorted key-value items in a networked distributed data storage system, according to some embodiments.

FIG. 6 depicts an example of storing output stream 430 of FIG. 4 as a collection of sorted runs 610, according to some embodiments. Each run 610 is stored in Key-Value Storage System 134. For example, each run 610 may be stored in a database table that is partitioned on the partition key 640 of the key-value items in the run. The key-value items within each run 610 are sorted within each partition of the run by sort key 650 of the key-value items in the run. Sort key 650 encompasses at least the ordering stamp added to the keys of the key-values items in stream 430 by control system 124, but may include one or more other fields of the keys as in the earlier example.

Key-value item 630 represents a key-value item that may be stored in a run 610. Key-value item 630 has partition key 640, sort key 650 including the ordering stamp generated for key-value item 630 by control system 124, and attribute(s) 660. Attribute(s) 660 may encompass other fields of the key and the value of key-value item 630 that are not part of the partition key 640 or sort key 650. The combination of partition key 640 and sort key 650 uniquely identifies key-value item 630 within run 610-3.

Each run 610 corresponds to a respective period of time. Each run 610 contains key-value items from stream 430 having ordering stamps for the respective period of time. When a new key-value item is inserted into Key-Value Storage System 134 it is typically inserted into the current run corresponding to a current period of time (e.g., the current day). After the respective period of time for the current run has passed (e.g., the day has ended), a new current run is created to contain new key-value items from stream 430 for the new current period of time. For example, assume each run 610 corresponds to a day and the current day is Monday, Jun. 15, 2020. Then, run 610-3 may correspond to Saturday, Jun. 13, 2020 and contain key-value items with ordering stamps for that day, run 610-2 may correspond to Sunday, Jun. 14, 2020 and contain key-value items with ordering stamps for that day, and run 610-1 (the current run) may correspond to Monday, Jun. 15, 2020 and contain key-value items with ordering stamps for the current day.

While in some embodiments each run 610 corresponds to one day, each run 610 corresponds to other periods of time such as, for example, one or more hours, multiple days, one or more weeks, etc. in other embodiments. No particular periods of time for runs 610 is required. Further, different runs 610 may in some embodiments correspond to different periods of time. Finally, the period of times for consecutive runs are not required to be adjacent. For example, there may be a gap in time between two consecutive runs.

Key-Value Storage System 134 may store a number of runs 610 depending on the data storage capacity of Key-Value Storage System 134. For example, Key-Value Storage System 134 may store thirty runs, one run for each of the last thirty days. The number of runs to store in Key-Value Storage System 134 may also be selected/configured based on long tail read/querying patterns for the key-value datastore. For example, if runs older than twenty days represent the long tail of historical read/querying patterns (e.g., most reads/queries received by control system 124 are for key-value items inserted in the past twenty days), then twenty or so days' worth of runs may be stored in Key-Value Storage System 134.

Reads Across Runs

Control system 124 may receive requests via network 126 to read key-value items from the key-value datastore. The requests may be sent by hosted applications 122, for example. A read request encompasses a request to get/fetch a particular key-value item, a request to scan for key-value items matching filtering criteria and a request to query for key-value items matching querying criteria.

A read request from a requestor (e.g., a hosted application) may request key-value items in multiple runs. In this case, the key-value items can be merged (e.g., via a merge sort) into a single set that is returned to the requestor so that all key-value items are sorted together. This is depicted by an example in FIG. 7.

Figure 7:
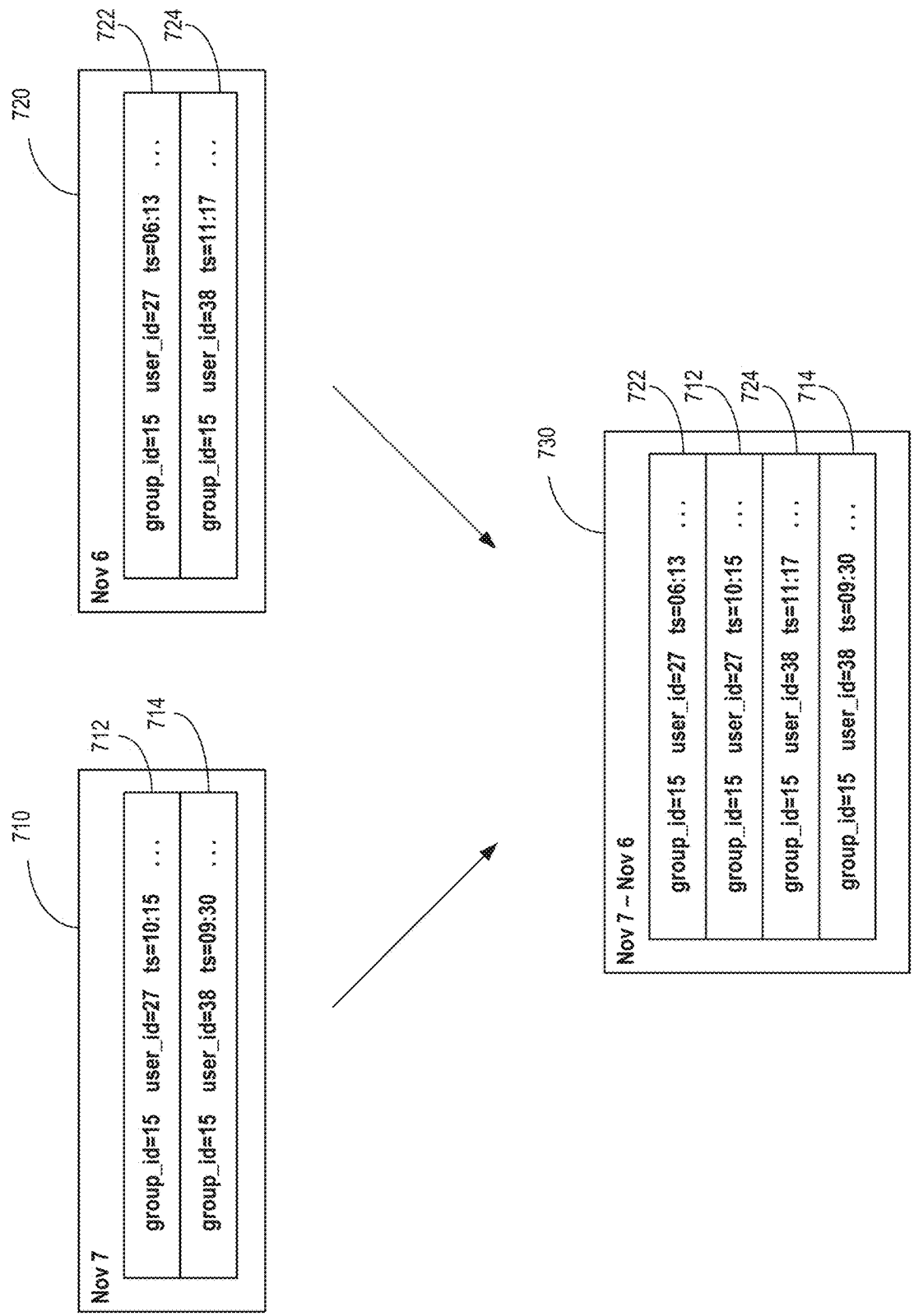
FIG. 7 depicts an example of merging of key-value items across runs, according to some embodiments.

In the example of FIG. 7, key-value items 712 and 714 of run 710 for the day "Nov. 7" and key-value items 722 and 724 of run 720 for the day "Nov. 6" are relevant to a read request. Within each run 710 and 720, key-value items are ordered first by the "user_id" field, and then by the ordering stamp "ts." Run 730 spanning the day "Nov. 7" and the day Nov. 6" may be returned to the requestor where key-value items 712, 714, 722 and 724 that are relevant to the read request are merged and sorted in run 730. In run 730, the key-value items 712, 714, 722 and 724 are ordered first by the "user_id" field, and then by the ordering stamp "ts" in combination with the respective time periods of the merged runs 710 and 720. As a result, the key-value item 724 of run 720 for the day "Nov. 6" is ordered earlier in run 730 than key-value item 714 of run 710 for the day "Nov. 7" even though 11:17 is later in the day than 09:30.

Figure 8:
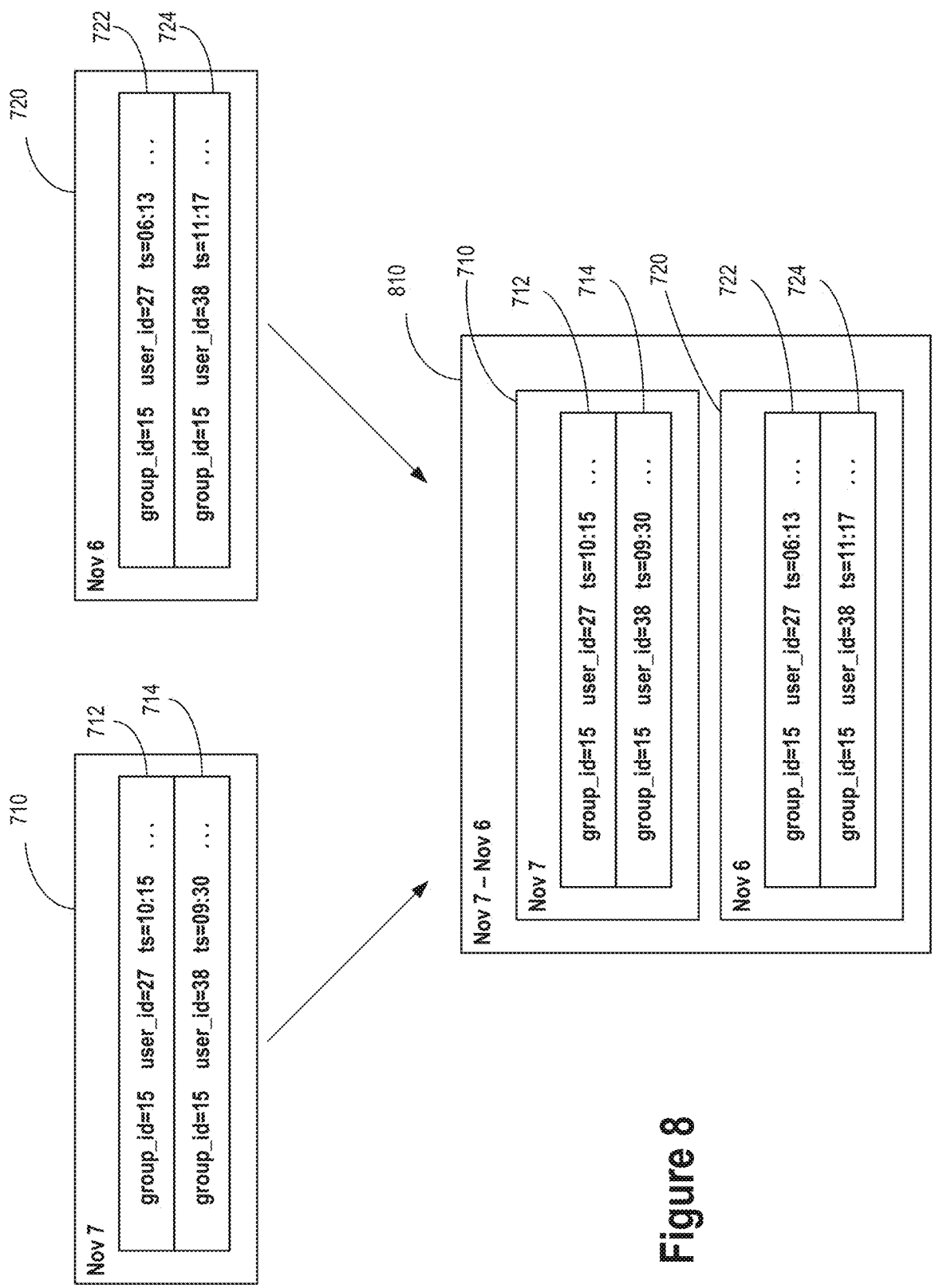
FIG. 8 depicts an example of responding to a read request without merging key-value items across runs, according to some embodiments.

Merging runs in this way requires extra computation to be performed by control system 124 or Key-Value Storage System 134. In some embodiments, when a read requests key-value items from multiple runs, the key-value items from the runs are not merged to conserve computing resources and to reduce data access latency from the perspective of the requestor. For example, instead of returning a single run containing merged and ordered key-value items to the requestor as depicted in FIG. 7, the multiple runs can be returned separately without merging them before returning them as depicted in FIG. 8. In FIG. 8, the runs 710 and 720 are returned separately in the response 810 to the request. The key-value items are ordered within each run 710 and 720 of the response 810. However, the key-value items are not merged and ordered across the runs 710 and 720 like in the example of FIG. 7. By doing so, computing resources are conserved and data access latencies are reduced.

Offloading Runs

According to some embodiments, control system 124 periodically offloads runs in Key-Value Storage System 134 to Object Storage System 144. This is done to free data storage space in Key-Value Storage System 134 for new runs. Control system 124 may offload runs in Key-Value Storage System 134 when one or more offload criteria are satisfied.

In some embodiments, the one or more offload criteria include a time interval. For example, once a day at the end of the day UTC, control system 124 may offload one or more runs (e.g., one or more of the oldest runs) in Key-Value Storage System 134 to Object Storage System 144. Other time intervals are possible (e.g., every number of hours, every other day, every week) and no particular time interval is required.

Other offload criteria can be used in addition to or instead of a time interval. Examples of other offload criteria include cardinality, usage and capacity.

Cardinality, in the context of offload criteria, refers to a number of runs stored in Key-Value Storage System 134. For example, in response to control system 124 determining that a number of runs stored in Key-Value Storage System 134 exceeds a cardinality threshold in terms of a number of runs, control system 124 may offload one or more runs in Key-Value Storage System 134 to Object Storage System 144.

Usage, in the context of offload criteria, refers to an amount of data storage space of Key-Value Storage System 134 that is used by runs stored in Key-Value Storage System 134. For example, in response to control system 124 determining that the usage of runs stored in Key-Value Storage System 134 exceeds a usage threshold in terms of a number of bytes or a percentage of total data storage space used, control system 124 may offload one or more runs in Key-Value Storage System 134 to Object Storage System 144.

Capacity, in the context of offload criteria, refers to an amount of remaining data storage space or quota remaining in Key-Value Storage System 134. For example, in response to control system 124 determining that the available (free) data storage space in Key-Value Storage System 134 is below a capacity threshold in terms of number of bytes or a percentage of total data storage space available, control system 124 may offload one or more runs in Key-Value Storage System 134 to Object Storage System 144.

Combinations of offload criteria can be used. For example, on the time interval, control system 124 may regularly check whether one of the cardinality, usage or capacity criteria is met.

Figure 9:
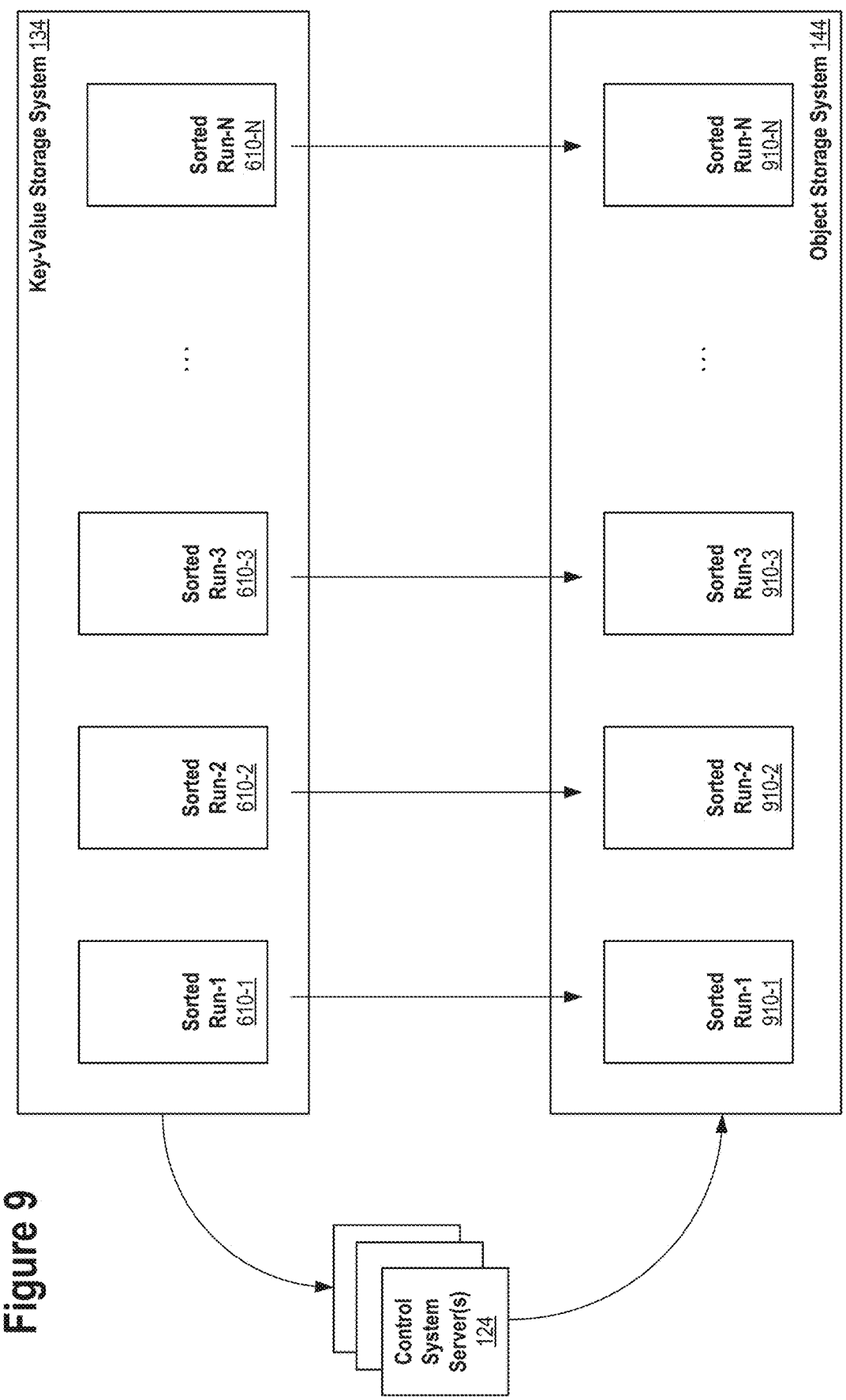
FIG. 9 depicts an example of offloading runs from one networked distributed data storage system to another distributed data storage system, according to some embodiments.

FIG. 9 depicts offloading runs, according to some embodiments. Each sorted run 610 is stored in Key-Value Storage System 134. For example, each sorted run 610 may be stored as a separate database table in Key-Value Storage System 1344. When offloading a run, control system 124 reads the key-value items of the run from Key-Value Storage System 134 via front-end servers 132 and network 150 and writes the key-value items to Object Storage System 144 via network 150 and front-end servers 142. This may be done in a streaming fashion such that control system 124 does not read the entire set of key-value items of the run from Key-Value Storage System 134 before beginning to write key-value items of the run to Object Storage System 144. Instead, control system 124 may begin written key-value items of the run to Object Storage System 144 as soon as it receives key-value items from Key-Value Storage System 134 and before receiving all key-value items of the run from Key-Value Storage System 134.

When writing key-value items of a run to Object Storage System 144, control system 124 can store the key-value of items of the run in one or more data objects of the Object Storage System 144. Multiple data objects may be used for various reasons. For example, if the key-value items of the run are partitioned, then separate data objects may be used for each partition. As another example, a data object may have a maximum allowable size (e.g., five terabytes) imposed by Object Storage System. If the total size of the key-value items of the run is greater than this maximum allowable size, then the key-value items may be split over multiple data objects.

When storing key-values of a run (e.g., 610-1) of Key-Value Storage System 134 in a corresponding run (e.g., 910-1) of Object Storage System 144, the key-value items may be read and written in the same order. In particular, key-value items can be read from Key-Value Storage System 134 by control system 124 in their order within the source run (e.g., 610-1) and written to Object Storage System 144 by control system 124 for storage in the target run (e.g., 910-1) in the same order. This can facilitate sequential data access operations by Key-Value Data Storage System 134 to read the key-value items and Object Storage System 144 to write the key-value items as opposed to random data-access operations thereby making the offload operation relatively efficient.

As mentioned, each run 610 of Key-Value Storage System 134 corresponds to a respective period of time. When a source run (e.g., 610-1) of Key-Value Storage System 134 is offloaded to Object Storage System 144, the target run (e.g., 910-1) of Object Storage System 144 can correspond to the same period of time. This is the example depicted in FIG. 9. Alternatively, multiple source runs of Key-Value Storage System 134 can be offloaded to a single target run of Object Storage System 144 in which the target run covers the respective periods of time of the multiple source runs. In this case, the key-value items of the multiple source runs are merged together in the single target run in order of their sort keys according to the respective time periods of the source runs (e.g., merged as in the example of FIG. 7 described above).

While in some embodiments merging runs into a single run is performed as described above with respect to FIG. 7, no particular merging algorithm is required so long as the algorithm orders the merged key-value items according to the sort key of the key-value items.

When a run (e.g., 610-1) is offloaded from Key-Value Object Storage 134 to Object Storage System 144, the key-value items of the run may be eventually or gradually deleted or allowed to be garbage collected to free data storage space in Key-Value Object Storage 134 for new runs.

Data Object Compaction

As runs accumulate in Object Storage System 144 over time as result of periodic offloading of runs from Key-Value Storage System 134, read performance of the key-value datastore can degrade since more data objects in Object Storage System 144 may need to be accessed by control system 124. To address this, runs may be gradually merged (compacted) into fewer data objects to reduce the total number of data objects.

Figure 10:
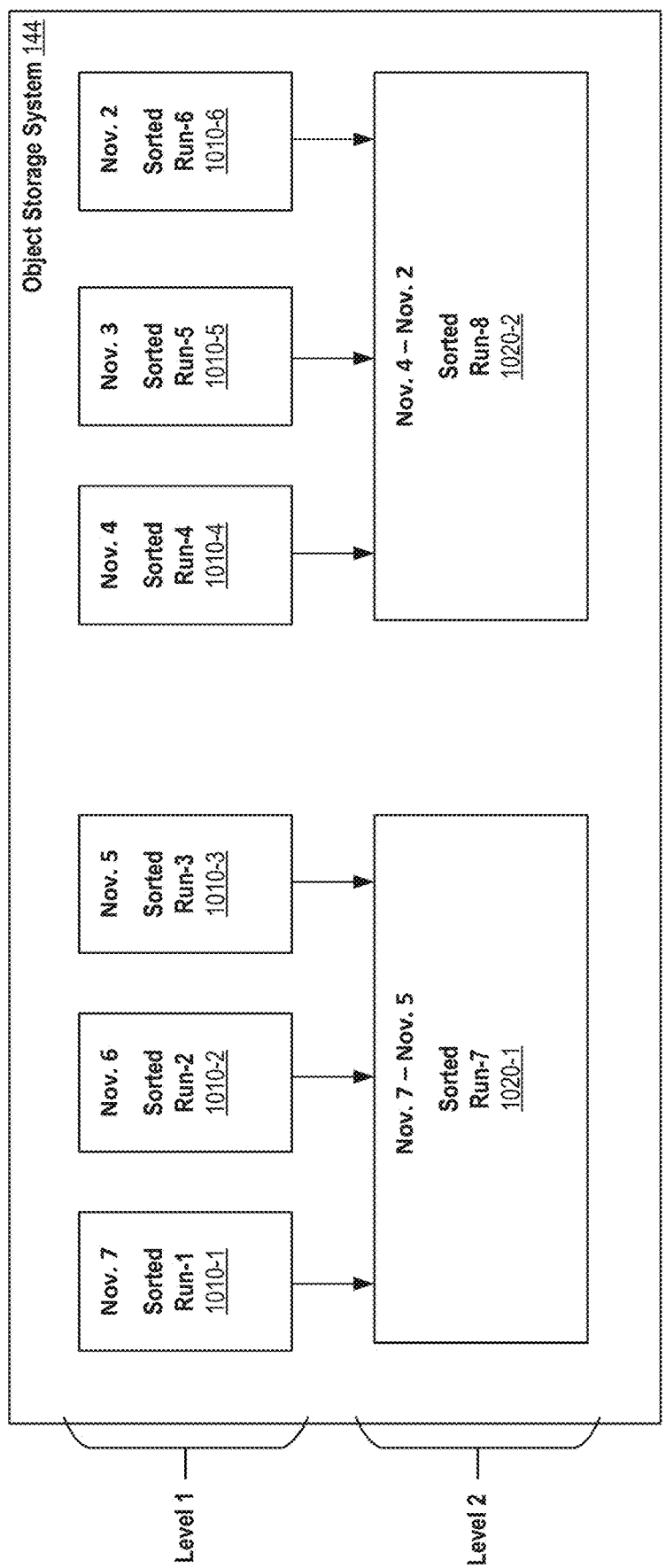
FIG. 10 depicts a compaction example, according to some embodiments.

FIG. 10 illustrates compaction of runs stored in Object Storage System 144, according to some embodiments. Level 1 of the multi-level index includes single day runs 1010 offloaded from Level 0 of the multi-level index at Key-Value Storage System 134. Control system 124 merges single day runs 1010-1, 1010-2 and 1010-3 for days Nov. 7, Nov. 6 and Nov. 5, respectively into a single three-day run 1020-1 covering the time period from Nov. 5 to Nov. 7. Likewise, with single day runs 1010-4, 1010-5, and 1010-6 of Level 1 for days Nov. 4, Nov. 3 and Nov. 2 and three day run 1020-2 of Level 2. In doing so, control system 124 reduces the number of data objects used to the store the key-value items. For example, each of runs 1010-1, 1010-2 and 1010-3 may be stored in separate data objects in Level 1 and run 1020-1 may be stored in fewer data objects (e.g., one) in Level 2. Likewise, with single day runs 1010-4, 1010-5, and 1010-6 of Level 1 and three day run 1020-2 of Level 2. Thus, with this compaction strategy, fewer data objects are used at Level X+1 to store the same number of runs than the number of data objects that are used in Level X.

Figure 11:
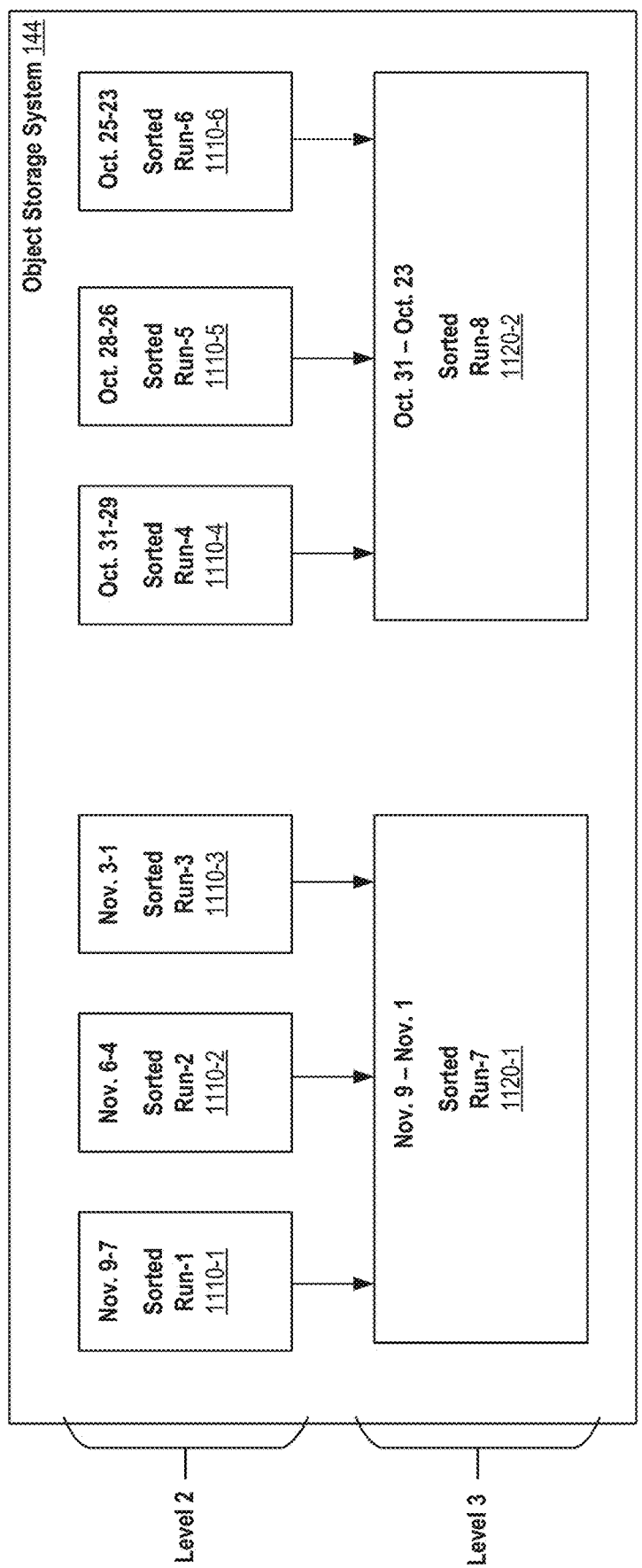
FIG. 11 depicts another compaction example, according to some embodiments.

FIG. 11 illustrates further compaction of runs stored in Object Storage System 144, according to some embodiments. Level 2 of the multi-level index includes three day runs 1110. Control system 124 merges three day runs 1110-1, 1110-2 and 1110-3 into a single nine day run 1120-1 of Level 3 covering the time period from Nov. 9 to Nov. 1. Likewise, with three day runs 1110-4, 1110-5, and 1110-6 of Level 2 and nine day run 1120-2 of Level 3. In doing so, control system 124 reduces the number of data objects used to the store the key-value items. For example, each of runs 1110-1, 1110-2 and 1110-3 may be stored in separate data objects in Level 2 and run 1120-1 may be stored in fewer data objects (e.g., one) in Level 3. Likewise, with three day runs 1110-4, 1110-5, and 1110-6 of Level 2 and nine day run 1120-2 of Level 3.

In the examples of FIG. 10 and FIG. 11, the "compaction step" between levels is 3. That is, three runs of Level X are compacted into a single run of Level X+1. However, no particular compaction step is required, and the compaction step may vary according to the requirements of the particular implementation at hand. Further, the compaction step may be different between different levels of the multi-level index. For example, the compaction step may vary depending on such factors as the number of data objects in a level, how often compaction is performed, etc.

Secondary Indexes

A bloom filter is a space efficient probabilistic data structure designed to aid in answer set membership queries. It supports two operations: (1) inserting a key and (2) testing the membership of a given key. To insert a key, multiple hash functions are applied to the map the key into multiple locations in a bit vector and the bit value at these locations are set to 1 while the other bit locations are set to 0. To check for the existence of a given key, the key is again hashed to multiple locations. If all the bits at these locations are 1, then the key probably exists in the set. If at least one of the bits at these locations is not 1, then the key does not exist in the set. By design, a bloom filter can report false positive but not false negatives.

According to some embodiments, a bloom filter is built for a data object stored in Object Storage System 144. The bloom filter can be built by control system 124 when offloading or compacting a run to the data object. Control system 124 may build the bloom filter based on the keys of the set of key-value items stored in the data block. All of the fields of the key including the ordering stamp may be used when building the bloom filter, or all of the fields of the key except the ordering stamp may be used. In the former case, the bloom filter can be used to determine if one or more key-value items with a given key probably exists in the data object. In the later case, the bloom filter can be used to determine if one or more key-value items with all of the fields of a given key ignoring the ordering stamp of the given key probably exists in the data object.

In some embodiments, the per-data object bloom filters are stored in Key-Value Data Storage 134. When control system 124 receives a read request, control system 124 may access the bloom filter created and stored in in Key-Value Data Storage 134 for a data object stored in Object Storage System 144 to determine if the data object contains a key-value item relevant to the read request. If the data object does not contain a key-value item relevant to the read request, then an access of the data object can be skipped by control system 124 when responding to the read request, thereby reducing the read request processing latency of control system 124.

Other types of secondary indexes may be built for data objects when offloading or compacting runs in Object Storage System 144.

For example, a data object in Object Storage System 144 may be associated with a key-range in Key-Value Data Storage System 134. The key-range may identify the lowest ordered key among the set of key-value items stored in the data object and the highest ordered key among the set of key-value items stored in the data object. A given key may be compared to against the lowest ordered key and against the highest ordered key. If the given key according to the comparison is ordered higher than (or equal to) the lowest ordered key and ordered lower than (or equal to) the highest ordered key, then the given key is in the key-range. When control system 124 receives a read request, control system 124 may access the key-range created and stored in Key-Value Data Storage 134 for a data object stored in Object Storage System 144 to determine if the data object contains a key-value item relevant to the read request. If the data object does not contain a key-value item relevant to the read request, then an access of the data object can be skipped by control system 124 when responding to the read request, thereby reducing the read request processing latency of control system 124.

For example, a data object in Object Storage System 144 may be associated with a time-range in Key-Value Data Storage System 134. The time-range may identify the earliest ordering stamp among the set of key-value items stored in the data object and the most recent ordering stamp among the set of key-value items stored in the data object. The ordering stamp of a given key may be compared to against the earliest ordering stamp and against the most recent ordering stamp of the time-range. If the given ordering stamp according to the comparison is later in time than or equal to the earliest ordering stamp and earlier than or equal to the most recent ordering stamp, then the given key is in the time-range. When control system 124 receives a read request, control system 124 may access the time-range created and stored in Key-Value Data Storage 134 for a data object stored in Object Storage System 144 to determine if the data object contains a key-value item relevant to the read request. If the data object does not contain a key-value item relevant to the read request, then an access of the data object can be skipped by control system 124 when responding to the read request, thereby reducing the read request processing latency of control system 124.

Key Range Zone Map

Some requests received by control system 124 may include queries that include a filter predicate on a non-sort key field such as, for example, a field of the values of a set of key-value items. In this case, the secondary indexes described above may not be able to be used by control system 124 to prune data blocks stored in Object Storage System 144 from access because the secondary indexes are built, at least in part, based on the sort key fields of the keys of the set of key-value items.

Figure 12:
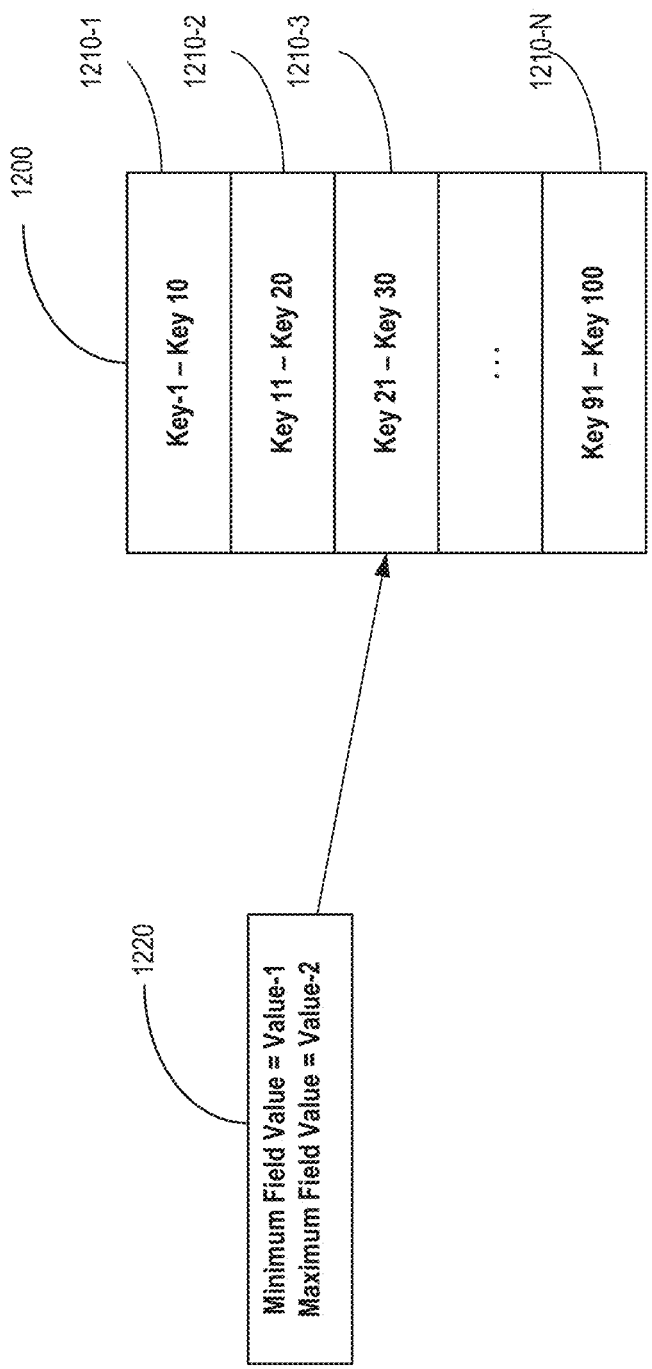
FIG. 12 depicts an example of a key-range zone map, according to some embodiments.

To address this, in some embodiments, a "statistical" index is maintained in Key-Value Storage System 134 for a data block stored in Object Storage System 144. This is depicted in FIG. 12. Data block 1200 stored in Object Storage System 144 contains a set of ordered key-value items. The set of key-value items are logically divided into subsets 1210 of ordered key-value items referred to herein as "key range zones." Each key range zone 1210 contains a subset of the ordered set of key-value items of the data block 1200. Each key range zone 1210 has a start key and an end key defining the respective key range zone of the data block 1200. The start key of a key range zone (e.g., 1210-1) is the lowest ordered key of the ordered key-value items of the key range zone. The end key of the key range zone is the highest ordered key of the ordered key-value items of the key range zone.

Data block 1200 may be divided into key range zones based on various criteria. For example, each key range zone may encompass up to a predetermined maximum number of key-value items of data block 1200. Or a key range zone may be selected based on the period of time covered by the earliest key-value item in the zone according to the item's ordering stamp and the latest key-value item in the zone according to the item's ordering stamp. For example, a key-value range may be selected to cover a day's worth of key-value items, or other predetermined period of time.

Each key range zone 1210 of data block 1200 is associated in the statistical index with a minimum field value and a maximum field value. The minimum field value is the minimum value for a field among all of the values of the key-value items in the zone. The maximum field value is the maximum value for the field among all of the values of the key-value items in the zone. For example, statistical index entry 1220 has a minimum field value "Value-1" and a maximum field value "Value-2" for key range zone 1210-3 defined by the key range Key 21 to Key 30. For example, assume the field in question is an "event" timestamp field of the values of the key-value items of zone 1210-3 such as, for example, a field specifying the time at which the key-value item was generated at a hosted application 122. In this example, the minimum field value of entry 1220 is the earliest timestamp for the event timestamp field among all of the values of the key-value items that belong to zone 1210-3. The maximum field value of entry 1220 is the most recent timestamp for the event timestamp field among all values of the key-value items that belong to the zone 1210-3.

In some related embodiments, the statistical index is used by control system 124 for key range zone pruning. In particular, for a query received by the control system 124 requesting key-value items having values that satisfy a filter predicate on a field of the values, control system 124 can use the statistical index to identify key range zones that cannot possibly contain key-value items that satisfy the query. Returning to the previous example, if the query has a filter predicate on the event timestamp field, then key range zone 1210-3 of data block 1200 can be pruned from access by control system 124 if the value of the event timestamp field in the filter predicate of the query is not within the time range defined by the minimum field value and the maximum field value of the index entry 120. Thus, key range zone 1210-3 can be skipped (pruned) when requesting the Object Storage System 144 to scan or otherwise access other key-value items in data block 1200 to identify key-value items that satisfy the query, thereby reducing query processing time.

Example System Environment

Figure 13:
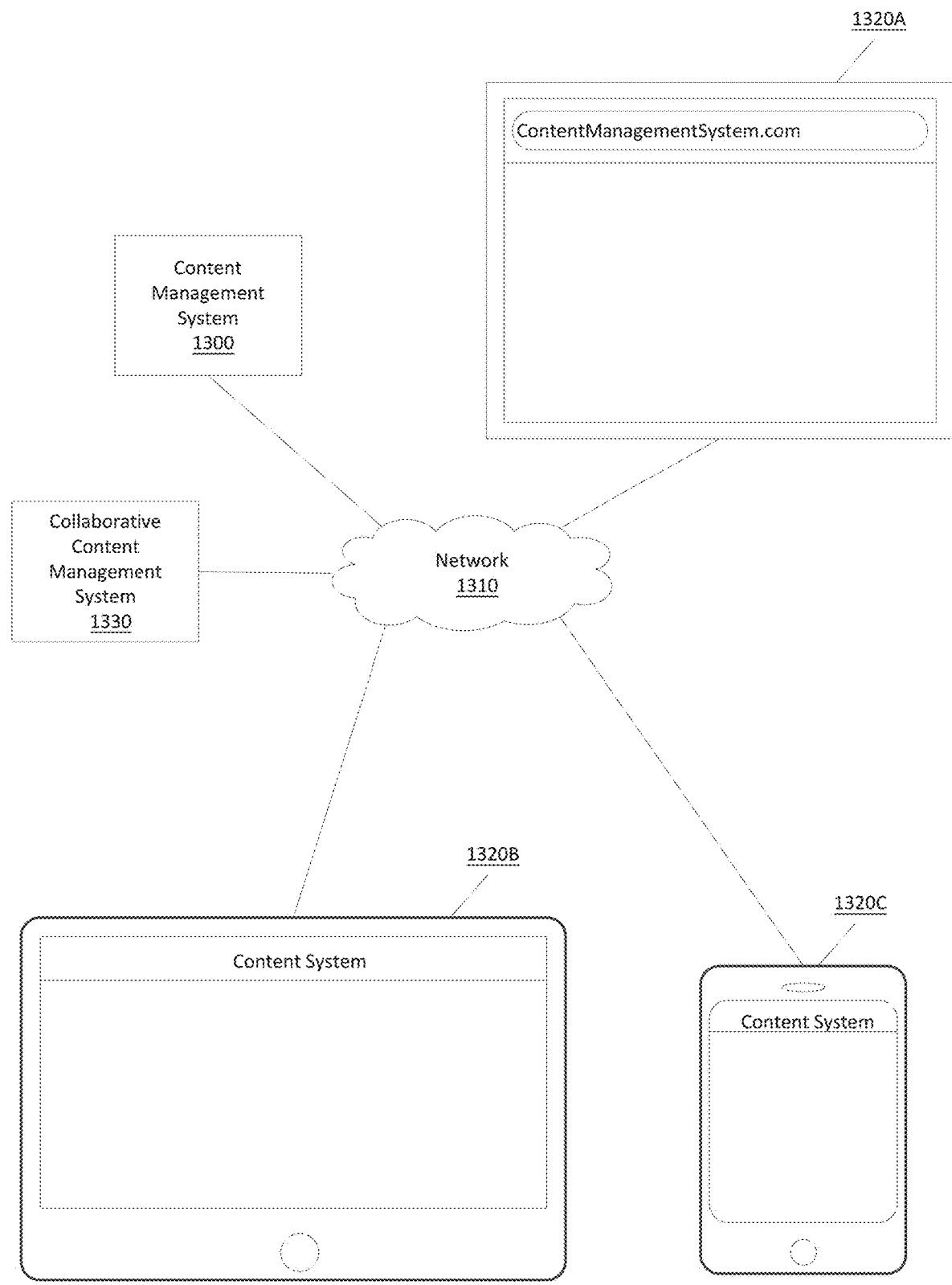
FIG. 13 depicts an example system environment of an example content management system, according to some embodiments.

FIG. 13 shows a system environment including content management system 1300, collaborative content management system 1330 and client devices 1320a, 1320b and 1320c (collectively or individually "1320"), according to some embodiments. Content management system 1300 provides functionality for sharing content items with one or more client devices 1320 and synchronizing content items between content management system 1300 and one or more client devices 1320.

The content stored by content management system 1300 can include any type of content items, such as documents, spreadsheets, collaborative content items, text files, audio files, image files, video files, webpages, executable files, binary files, placeholder files that reference other content items, etc.

In some embodiments, a content item can be a portion of another content item, such as an image that is included in a document. Content items can also include collections, such as folders, namespaces, playlists, albums, etc., that group other content items together. The content stored by content management system 1300 may be organized in one configuration in folders, tables, or in other database structures (e.g., object oriented, key/value etc.).

In some embodiments, the content stored by content management system 1300 includes content items created by using third party applications, e.g., word processors, video and image editors, database management systems, spreadsheet applications, code editors, and so forth, which are independent of content management system 1300.

In some embodiments, content stored by content management system 1300 includes content items, e.g., collaborative content items, created using a collaborative interface provided by collaborative content management system 1330. In various implementations, collaborative content items can be stored by collaborative content management system 1330, with content management system 1300, or external to content management system 1300. A collaborative interface can provide an interactive content item collaborative platform whereby multiple users can simultaneously create and edit collaborative content items, comment in the collaborative content items, and manage tasks within the collaborative content items.

It should be noted that while content management system 1300 and collaborative content management system 1330 are depicted as separate systems in FIG. 13, these systems can be integrated or combined into a single system such that the respective functionality of these systems described herein are provided by the single system. The system may include one or more servers configured to provide the functionality discussed herein for the systems 1300 and 1330. Further, while FIG. 13 depicts both content management system 1300 and collaborative content management system 1330 in the system environment, just one of content management system 1300 or collaborative content management system 1330 may exist in the system environment. The system may include one or more servers configured to provide the functionality discussed herein for just one of system 1300 or system 1330. Finally, a system in system environment may combine or integrate selected functionality discussed herein for the systems 1300 and 1330 where the system does not implement some of the functionality discussed herein for system 1300 or system 1330.

Users may create accounts at content management system 1300 and store content thereon by sending such content from client device 1320 to content management system 1300. The content can be provided by users and associated with user accounts that may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 1320 communicate with content management system 1300 and collaborative content management system 1330 through network 1310. The network may be any suitable communications network for data transmission. In some example embodiments, network 1310 is the Internet and uses standard communications technologies and/or protocols. Thus, network 1310 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc.

Similarly, the networking protocols used on network 1310 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 1310 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc.

In some embodiments, the entities use custom and/or dedicated data communications technologies instead of, or in addition to, the ones described above.

Example Client Device

Figure 14:
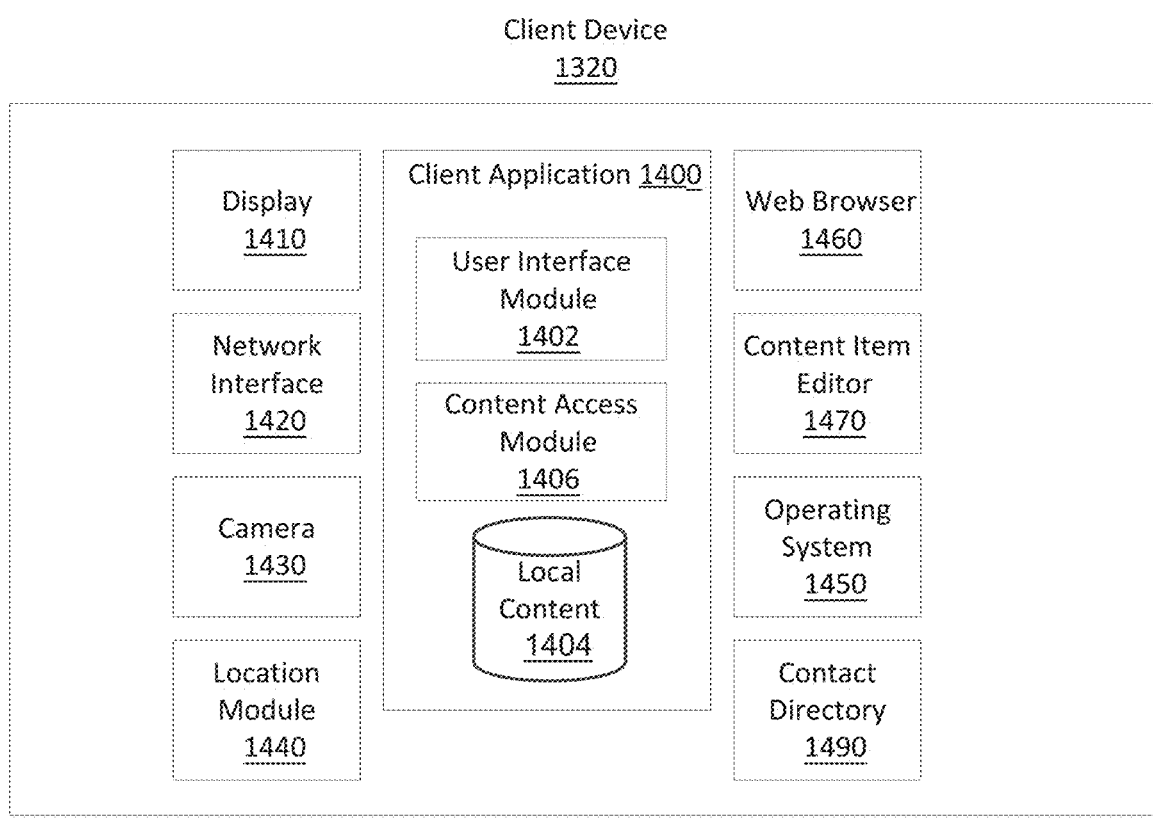
FIG. 14 depicts components of an example client device, according to some embodiments.

FIG. 14 shows a block diagram of the components of a client device 1320 according to some embodiments. Client devices 1320 generally include devices and modules for communicating with content management system 1300 and a user of client device 1320. Client device 1320 includes display 1410 for providing information to the user, and in certain client devices 1320 includes a touchscreen. Client device 1320 also includes network interface 1420 for communicating with content management system 1300 via network 1310. There are additional components that may be included in client device 1320 but that are not shown, for example, one or more computer processors, local fixed memory (RAM and ROM), as well as optionally removable memory (e.g., SD-card), power sources, and audio-video outputs.

In some embodiments, client device 1320 includes additional components such as camera 1430 and location module 1440. Location module 1440 determines the location of client device 1320, using, for example, a global positioning satellite signal, cellular tower triangulation, or other methods. Location module 1440 may be used by client application 1400 to obtain location data and add the location data to metadata about a content item.

Client devices 1320 maintain various types of components and modules for operating the client device and accessing content management system 1300. The software modules can include operating system 1450 or a collaborative content item editor 1470. Collaborative content item editor 1470 is configured for creating, viewing and modifying collaborative content items such as text documents, code files, mixed media files (e.g., text and graphics), presentations or the like. Operating system 1450 on each device provides a local file management system and executes the various software modules such as content management system client application 1400 and collaborative content item editor 1470. A contact directory 1490 stores information on the user's contacts, such as name, telephone numbers, company, email addresses, physical address, website URLs, and the like.

Client devices 1320 access content management system 1300 and collaborative content management system 1330 in a variety of ways. Client device 1320 may access these systems through a native application or software module, such as content management system client application 1400. Client device 1320 may also access content management system 1300 through web browser 1460. As an alternative, the client application 1400 may integrate access to content management system 1300 with the local file management system provided by operating system 1450. When access to content management system 1300 is integrated in the local file management system, a file organization scheme maintained at the content management system is represented at the client device 1320 as a local file structure by operating system 1450 in conjunction with client application 1400.

Client application 1400 manages access to content management system 1300 and collaborative content management system 1330. Client application 1400 includes user interface module 1402 that generates an interface to the content accessed by client application 1400 and is one means for performing this function. The generated interface is provided to the user by display 1410. Client application 1400 may store content accessed from a content storage at content management system 1300 in local content 1404. While represented here as within client application 1400, local content 1404 may be stored with other data for client device 1320 in nonvolatile storage. When local content 1404 is stored this way, the content is available to the user and other applications or modules, such as collaborative content item editor 1470, when client application 1400 is not in communication with content management system 1300. Content access module 1406 manages updates to local content 1404 and communicates with content management system 1300 to synchronize content modified by client device 1320 with content maintained on content management system 1300, and is one means for performing this function. Client application 1400 may take various forms, such as a stand-alone application, an application plugin, or a browser extension.

Example Content Management System

Figure 15:
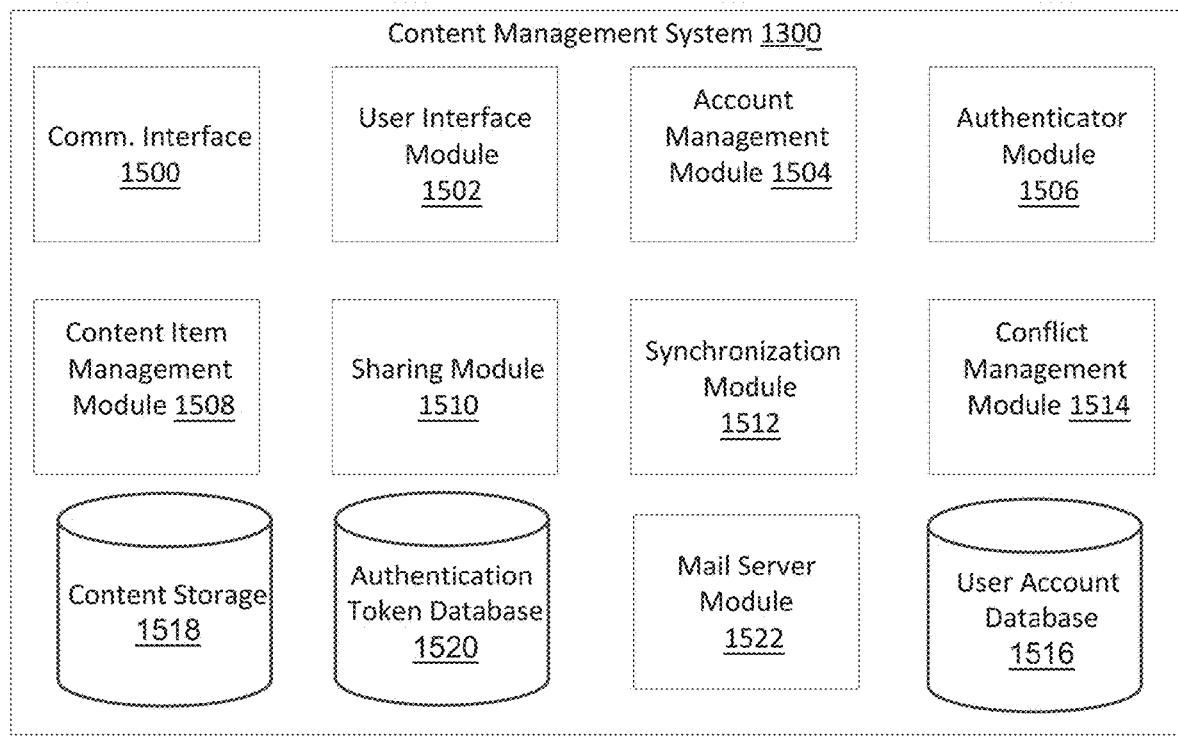
FIG. 15 depicts an example content management system, according to some embodiments.

FIG. 15 shows a block diagram of the content management system 1300 according to some embodiments. To facilitate the various content management services, a user can create an account with content management system 1300. The account information can be maintained in user account database 1516, and is one means for performing this function. User account database 1516 can store profile information for registered users. In some cases, the only personal information in the user profile is a username and/or email address. However, content management system 1300 can also be configured to accept additional user information, such as password recovery information, demographics information, payment information, and other details. Each user is associated with a userID and a username. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on derivative identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 1516 can also include account management information, such as account type, e.g. free or paid; usage information for each user, e.g., file usage history; maximum storage space authorized; storage space used; content storage locations; security settings; personal configuration settings; content sharing data; etc. Account management module 1504 can be configured to update and/or obtain user account details in user account database 1516. Account management module 1504 can be configured to interact with any number of other modules in content management system 1300.

An account can be used to store content items, such as collaborative content items, audio files, video files, etc., from one or more client devices associated with the account. Content items can be shared with multiple users and/or user accounts. In some implementations, sharing a content item can include associating, using sharing module 1510, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some embodiments, shared content items can be accessible to a recipient user without requiring authentication into a user account. This can include sharing module 1510 providing access to a content item through activation of a link associated with the content item or providing access through a globally accessible shared folder.

The content can be stored in content storage 1518, which is one means for performing this function. Content storage 1518 can be a storage device, multiple storage devices, or a server. Alternatively, content storage 1518 can be a cloud storage provider or network storage accessible via one or more communications networks. In one configuration, content management system 1300 stores the content items in the same organizational structure as they appear on the client device. However, content management system 1300 can store the content items in its own order, arrangement, or hierarchy.

Content storage 1518 can also store metadata describing content items, content item types, and the relationship of content items to various accounts, folders, or groups. The metadata for a content item can be stored as part of the content item or can be stored separately. In one configuration, each content item stored in content storage 1518 can be assigned a system-wide unique identifier.

Content storage 1518 can decrease the amount of storage space required by identifying duplicate files or duplicate segments of files. Instead of storing multiple copies of an identical content item, content storage 1518 can store a single copy and then use a pointer or other mechanism to link the duplicates to the single copy. Similarly, content storage 1518 stores files using a file version control mechanism that tracks changes to files, different versions of files (such as a diverging version tree), and a change history. The change history can include a set of changes that, when applied to the original file version, produces the changed file version.

Content management system 1300 automatically synchronizes content from one or more client devices, using synchronization module 1512, which is one means for performing this function. The synchronization is platform agnostic. That is, the content is synchronized across multiple client devices 1320 of varying type, capabilities, operating systems, etc. For example, client application 1400 synchronizes, via synchronization module 1512 at content management system 1300, content in client device 1320's file system with the content in an associated user account on system 1300. Client application 1400 synchronizes any changes to content in a designated folder and its sub-folders with the synchronization module 1512. Such changes include new, deleted, modified, copied, or moved files or folders. Synchronization module 1512 also provides any changes to content associated with client device 1320 to client application 1400. This synchronizes the local content at client device 1320 with the content items at content management system 1300.

Conflict management module 1514 determines whether there are any discrepancies between versions of a content item located at different client devices 1320. For example, when a content item is modified at one client device and a second client device, differing versions of the content item may exist at each client device. Synchronization module 1512 determines such versioning conflicts, for example by identifying the modification time of the content item modifications. Conflict management module 1514 resolves the conflict between versions by any suitable means, such as by merging the versions, or by notifying the client device of the later submitted version.

A user can also view or manipulate content via a web interface generated by user interface module 1502. For example, the user can navigate in web browser 1460 to a web address provided by content management system 1300. Changes or updates to content in content storage 1518 made through the web interface, such as uploading a new version of a file, are synchronized back to other client devices 1320 associated with the user's account. Multiple client devices 1320 may be associated with a single account and files in the account are synchronized between each of the multiple client devices 1320.

Content management system 1300 includes communications interface 1500 for interfacing with various client devices 1320, and with other content and/or service providers via an Application Programming Interface (API), which is one means for performing this function. Certain software applications access content storage 1518 via an API on behalf of a user. For example, a software package, such as an app on a smartphone or tablet computing device, can programmatically make calls directly to content management system 1300, when a user provides credentials, to read, write, create, delete, share, or otherwise manipulate content. Similarly, the API can allow users to access all or part of content storage 1518 through a web site.

Content management system 1300 can also include authenticator module 1506, which verifies user credentials, security tokens, API calls, specific client devices, etc., to determine whether access to requested content items is authorized, and is one means for performing this function. Authenticator module 1506 can generate one-time use authentication tokens for a user account. Authenticator module 1506 assigns an expiration period or date to each authentication token. In addition to sending the authentication tokens to requesting client devices, authenticator module 1506 can store generated authentication tokens in authentication token database 1520. After receiving a request to validate an authentication token, authenticator module 1506 checks authentication token database 1520 for a matching authentication token assigned to the user.

Once the authenticator module 1506 identifies a matching authentication token, authenticator module 1506 determines if the matching authentication token is still valid. For example, authenticator module 1506 verifies that the authentication token has not expired or was not marked as used or invalid. After validating an authentication token, authenticator module 1506 may invalidate the matching authentication token, such as a single-use token. For example, authenticator module 1506 can mark the matching authentication token as used or invalid or delete the matching authentication token from authentication token database 1520.

In some embodiments, content management system 1300 includes a content management module 1508 for maintaining a content directory that identifies the location of each content item in content storage 1518, and allows client applications to request access to content items in the storage 1518, and which is one means for performing this function. A content entry in the content directory can also include a content pointer that identifies the location of the content item in content storage 1518. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some example embodiments, multiple user account identifiers can be associated with a single content entry indicating that the content item has shared access by the multiple user accounts.

In some embodiments, the content management system 1300 can include a mail server module 1522. The mail server module 1522 can send (and receive) collaborative content items to (and from) other client devices using the collaborative content management system 1300. The mail server module can also be used to send and receive messages between users in the content management system.

Example Collaborative Content Management System

Figure 16:
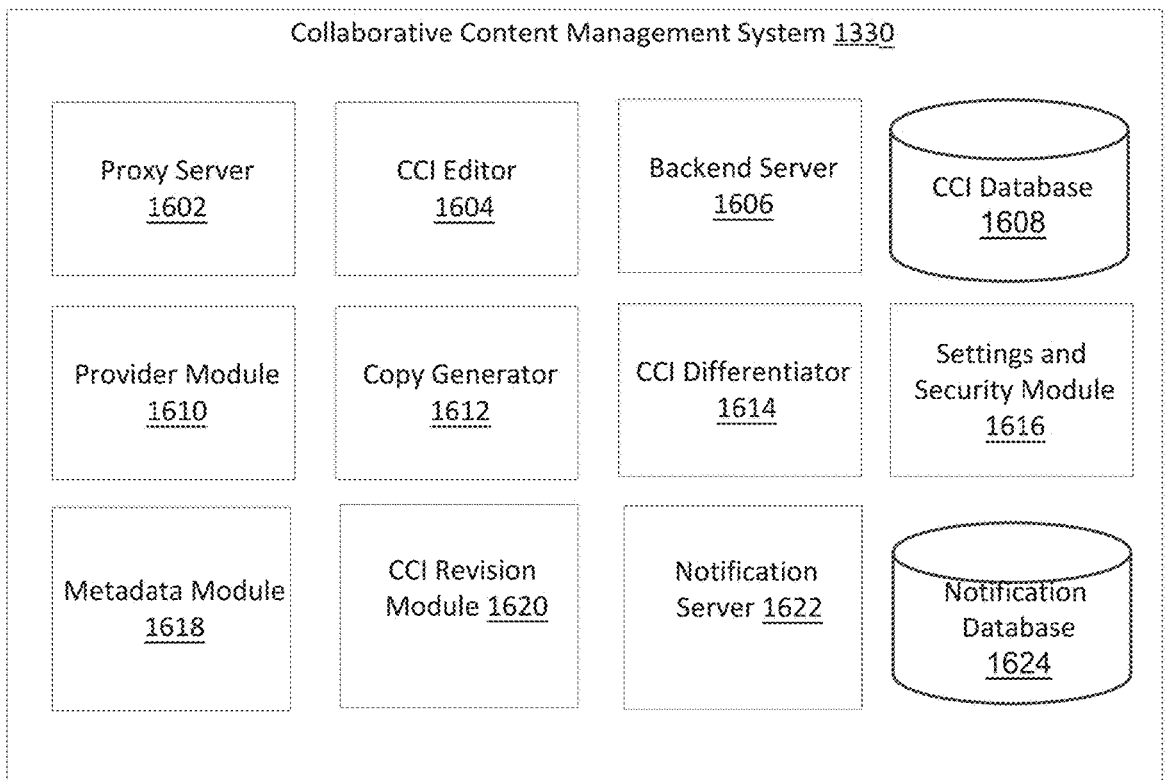
FIG. 16 depicts an example collaborative content management system, according to some embodiments.

FIG. 16 shows a block diagram of the collaborative content management system 1330, according to example embodiments. Collaborative content items can be files that users can create and edit using a collaborative content items editor 1470 and can contain collaborative content item elements. Collaborative content item elements may include any type of content such as text; images, animations, videos, audio, or other multi-media; tables; lists; references to external content; programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 1320, using sharing 1510 and synchronization 1512 modules of content management system 1300. Users operate client devices 1320 to create and edit collaborative content items, and to share collaborative content items with other users of client devices 1320. Changes to a collaborative content item by one client device 1320 are propagated to other client devices 1320 of users associated with that collaborative content item.

In some embodiments, collaborative content management system 1330 is separate from content management system 1300 and can communicate with it to obtain its services. In some embodiments, collaborative content management system 1330 is a subsystem of the component of content management system 1300 that provides sharing and collaborative services for various types of content items. User account database 1516 and authentication token database 1520 from content management system 1300 are used for accessing collaborative content management system 1330 described herein.

Collaborative content management system 1330 can include various servers for managing access and edits to collaborative content items and for managing notifications about certain changes made to collaborative content items. Collaborative content management system 1330 can include proxy server 1602, collaborative content item editor 1604, backend server 1606, and collaborative content item database 1608, access link module 1610, copy generator 1612, collaborative content item differentiator 1614, settings module 1616, metadata module 1618, revision module 1620, notification server 1622, and notification database 1624. Proxy server 1602 handles requests from client applications 1400 and passes those requests to the collaborative content item editor 1604. Collaborative content item editor 1604 manages application level requests for client applications 1400 for editing and creating collaborative content items, and selectively interacts with backend servers 1606 for processing lower level processing tasks on collaborative content items and interfacing with collaborative content items database 1608 as needed. Collaborative content items database 1608 contains a plurality of database objects representing collaborative content items, comment threads, and comments. Each of the database objects can be associated with a content pointer indicating the location of each object within the CCI database 1608. Notification server 1622 detects actions performed on collaborative content items that trigger notifications, creates notifications in notification database 1624, and sends notifications to client devices.

Client application 1400 sends a request relating to a collaborative content item to proxy server 1602. Generally, a request indicates the userID ("UID") of the user, and the collaborativeContentItemID ("NID") of the collaborative content item, and additional contextual information as appropriate, such as the text of the collaborative content item. When proxy server 1602 receives the request, the proxy server 1602 passes the request to the collaborative content item editor 1604. Proxy server 1602 also returns a reference to the identified collaborative content items proxy server 1602 to client application 1400, so the client application can directly collaborative content item editor 1604 for future requests. In alternative example embodiments, client application 1400 initially communicates directly with a specific collaborative content item editor 1604 assigned to the userID.

When collaborative content item editor 1604 receives a request, it determines whether the request can be executed directly or by a backend server 1606. When the request adds, edits, or otherwise modifies a collaborative content item the request is handled by the collaborative content item editor 1604. If the request is directed to a database or index inquiry, the request is executed by a backend server 1606. For example, a request from client device 1320 to view a collaborative content item or obtain a list of collaborative content items responsive to a search term is processed by backend server 1606.

The access module 1610 receives a request to provide a collaborative content item to a client device. In some example embodiments, the access module generates an access link to the collaborative content item, for instance in response to a request to share the collaborative content item by an author. The access link can be a hyperlink including or associated with the identification information of the CCI (e.g., unique identifier, content pointer, etc.). The hyperlink can also include any type of relevant metadata within the content management system (e.g., author, recipient, time created, etc.). In some example embodiments, the access module can also provide the access link to user accounts via the network 1310, while in other example embodiments the access link can be provided or made accessible to a user account and is accessed through a user account via the client device. In some embodiments, the access link will be a hyperlink to a landing page (e.g., a webpage, a digital store front, an application login, etc.) and activating the hyperlink opens the landing page on a client device. The landing page can allow client devices not associated with a user account to create a user account and access the collaborative content item using the identification information associated with the access link. Additionally, the access link module can insert metadata into the collaborative content item, associate metadata with the collaborative content item, or access metadata associated with the collaborative content item that is requested.

The access module 1610 can also provide collaborative content items via other methods. For example, the access module 1610 can directly send a collaborative content item to a client device or user account, store a collaborative content item in a database accessible to the client device, interact with any module of the collaborative content management system to provide modified versions of collaborative content items (e.g., the copy generator 1612, the CCI differentiator 1614, etc.), sending content pointer associated with the collaborative content item, sending metadata associated with the collaborative content item, or any other method of providing collaborative content items between devices in the network. The access module can also provide collaborative content items via a search of the collaborative content item database (e.g., search by a keyword associated with the collaborative content item, the title, or a metadata tag, etc.).

The copy generator 1612 can duplicate a collaborative content item. Generally, the copy generator duplicates a collaborative content item when a client device selects an access link associated with the collaborative content item. The copy generator 1612 accesses the collaborative content item associated with the access link and creates a derivative copy of the collaborative content item for every request received. The copy generator 1612 stores each derivative copy of the collaborative content item in the collaborative content item database 1608. Generally, each copy of the collaborative content item that is generated by the copy generator 1612 is associated with both the client device from which the request was received, and the user account associated with the client device requesting the copy. When the copy of the collaborative content item is generated it can create a new unique identifier and content pointer for the copy of the collaborative content item. Additionally, the copy generator 1612 can insert metadata into the collaborative content item, associate metadata with the copied collaborative content item, or access metadata associated with the collaborative content item that was requested to be copied.

The collaborative content item differentiator 1614 determines the difference between two collaborative content items. In some embodiments, the collaborative content item differentiator 1614 determines the difference between two collaborative content items when a client device selects an access hyperlink and accesses a collaborative content item that the client device has previously used the copy generator 1612 to create a derivative copy. The content item differentiator can indicate the differences between the content elements of the compared collaborative content items. The collaborative content item differentiator 1614 can create a collaborative content item that includes the differences between the two collaborative content items, e.g. a differential collaborative content item. In some embodiments, the collaborative content item differentiator provides the differential collaborative content item to a requesting client device 1320. The differentiator 1614 can store the differential collaborative content item in the collaborative content item database 1608 and generate identification information for the differential collaborative content item. Additionally, the differentiator 1614 can insert metadata into the accessed and created collaborative content items, associate metadata with the accessed and created collaborative content item, or access metadata associated with the collaborative content items that were requested to be differentiated.

The settings and security module 1616 can manage security during interactions between client devices 1320, the content management system 1300, and the collaborative content management system 1330. Additionally, the settings and security module 1616 can manage security during interactions between modules of the collaborative content management system.

For example, when a client device 1320 attempts to interact within any module of the collaborative content management system 1300, the settings and security module 1616 can manage the interaction by limiting or disallowing the interaction. Similarly, the settings and security module 1616 can limit or disallow interactions between modules of the collaborative content management system 1330. Generally, the settings and security module 1616 accesses metadata associated with the modules, systems 1300 and 1330, devices 1320, user accounts, and collaborative content items to determine the security actions to take. Security actions can include requiring authentication of client devices 1320 and user accounts, requiring passwords for content items, removing metadata from collaborative content items, preventing collaborative content items from being edited, revised, saved or copied, or any other security similar security action. Additionally, settings and security module can access, add, edit or delete any type of metadata associated with any element of content management system 1300, collaborative content management system 1330, client devices 1320, or collaborative content items.

The metadata module 1618 manages metadata within with the collaborative content management system. Generally, metadata can take three forms within the collaborative content management system: internal metadata, external metadata, and device metadata. Internal metadata is metadata within a collaborative content item, external metadata is metadata associated with a CCI but not included or stored within the CCI itself, and device metadata is associated with client devices. At any point the metadata module can manage metadata by changing, adding, or removing metadata.

Some examples of internal metadata can be identifying information within collaborative content items (e.g., email addresses, names, addresses, phone numbers, social security numbers, account or credit card numbers, etc.); metadata associated with content elements (e.g., location, time created, content element type; content element size; content element duration, etc.); comments associated with content elements (e.g., a comment giving the definition of a word in a collaborative content item and its attribution to the user account that made the comment); or any other metadata that can be contained within a collaborative content item.

Some examples of external metadata can be content tags indicating categories for the metadata; user accounts associated with a CCI (e.g., author user account, editing user account, accessing user account etc.); historical information (e.g., previous versions, access times, edit times, author times, etc.); security settings; identifying information (e.g., unique identifier, content pointer); collaborative content management system 1330 settings; user account settings; or any other metadata that can be associated with the collaborative content item.

Some examples of device metadata can be: device type; device connectivity; device size; device functionality; device sound and display settings; device location; user accounts associated with the device; device security settings; or any other type of metadata that can be associated with a client device 1320.

The collaborative content item revision module 1620 manages application level requests for client applications 1400 for revising differential collaborative content items and selectively interacts with backend servers 1606 for processing lower level processing tasks on collaborative content items and interfacing with collaborative content items database 1608 as needed. The revision module can create a revised collaborative content item that is some combination of the content elements from the differential collaborative content item. The revision module 1620 can store the revised collaborative content item in the collaborative content item database or provide the revised collaborative content item to a client device 1320. Additionally, the revision module 1620 can insert metadata into the accessed and created collaborative content items, associate metadata with the accessed and created collaborative content item, or access metadata associated with the collaborative content items that were requested to be differentiated.

Content management system 1300 and collaborative content management system 1330 may be implemented using a single computer, or a network of computers, including cloud-based computer implementations. The operations of content management system 1300 and collaborative content management system 1330 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system.

Computing System Implementation

An above embodiment can be implemented using a computing system that includes one or more hardware processors and storage media. The storage media can store instructions which, when executed by the computing system, cause the computing system to perform a computer-implemented operation of an above embodiment.

The one or more hardware processors and the storage media of the computing system can be provided by a computing device. An example computing device 1700 with hardware processor 1704 and storage media (e.g., storage system 1710, ROM 1708 and main memory 1706) is described below with respect to FIG. 17. Alternatively, the hardware processors and the storage media of the computing system can be provided by multiple computing devices such as multiple computing devices in a distributed computing arrangement where computing devices are continuously, intermittently or periodically interconnected by a data communications network.

A computing device of the computing system can host a hypervisor that operates on the computing device and emulates or virtualizes computing hardware. A hypervisor can be a Type-1 (bare-metal hypervisor) or Type-2 hypervisor (hosted hypervisor), for example.

A computing device of the computing system can employ operating system-level virtualization in addition to, or in the absence of, a hypervisor. With operating system-level virtualization, an operating system kernel facilitates multiple isolated user space instances sometimes referred to as containers, zones, virtual private servers, partitions, virtual environments, virtual kernels, jails, etc.

Example Computing Device

Figure 17:
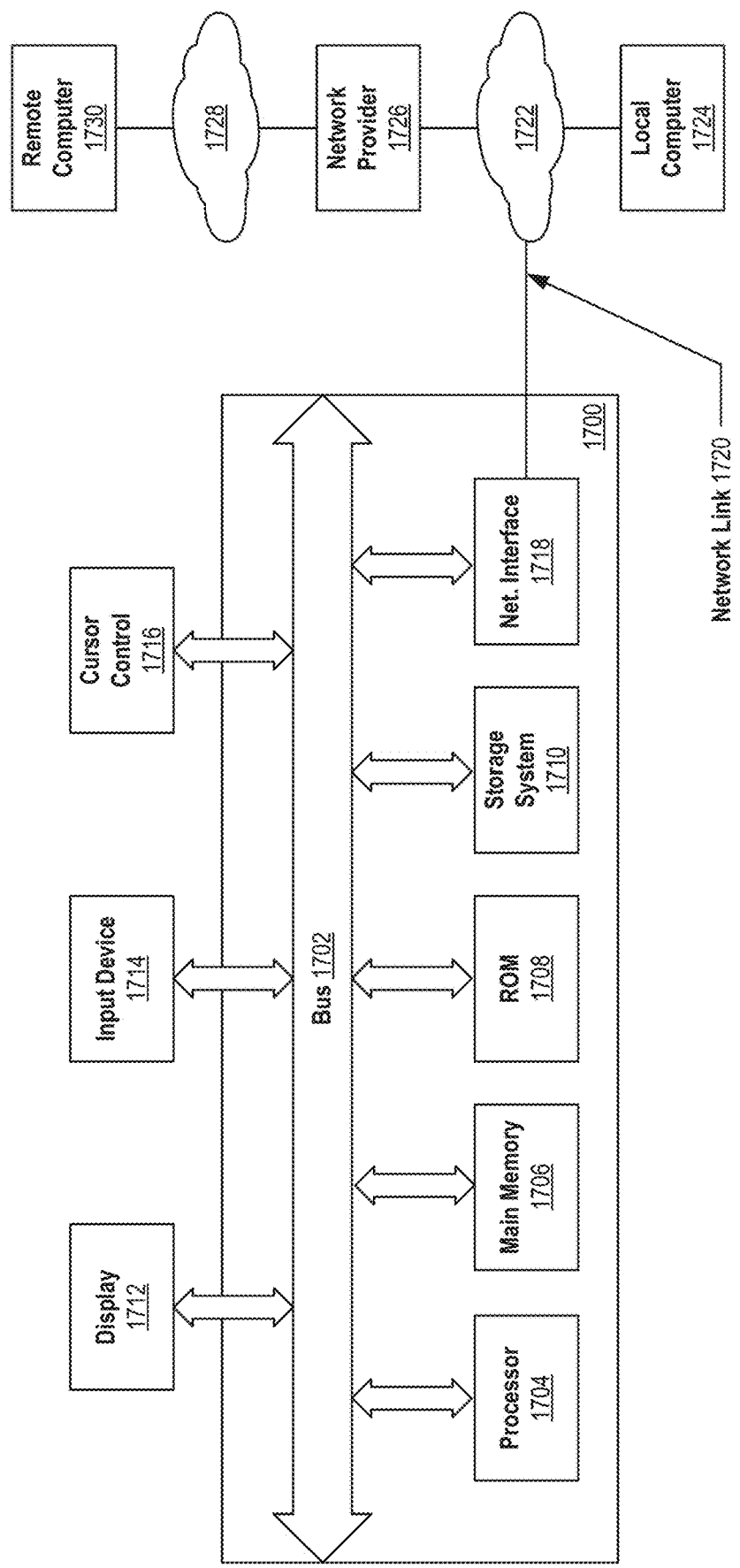
FIG. 17 is a block diagram of an example computing device that can be used in an implementation of the invention, according to some embodiments.

FIG. 17 is a block diagram of example computing device 1700 that can be used in an implementation of the invention. Computing device 1700 includes bus 1702 or other communication mechanism for communicating information, and hardware processor 1704 coupled with bus 1702 for processing information.

Hardware processor 1704 can be a general-purpose microprocessor, a central processing unit (CPU) or a core thereof, a graphics processing unit (GPU), or a system on a chip (SoC).

Computing device 1700 also includes main memory 1706 coupled to bus 1702 for storing information and instructions to be executed by hardware processor 1704. Main memory 1706 also may be used for storing temporary variables or other intermediate information during execution of instructions by hardware processor 1704.

Computing device 1700 includes read-only memory (ROM) 1708 or other static storage device coupled to bus 1702 for storing static information and instructions for hardware processor 1704.

Storage system 1710 implemented by a non-volatile memory device is provided and coupled to bus 1702 for storing information and instructions.

Computing device 1700 is coupled via bus 1702 to display 1712, such as a liquid crystal display (LCD), a light emitting diode (LED) display, or a cathode ray tube (CRT), for displaying information to a computer user. Display 1712 may be combined with a touch sensitive surface to form a touch screen display. The touch sensitive surface may be an input device for communicating information including direction information and command selections to hardware processor 1704 and for controlling cursor movement on display 1712 via touch input directed to the touch sensitive surface such by tactile or haptic contact with the touch sensitive surface by a user's finger, fingers, or hand or by a hand-held stylus or pen. The touch sensitive surface may be implemented using a variety of different touch detection and location technologies including, for example, resistive, capacitive, surface acoustical wave (SAW) or infrared technology.

Input device 1714, including alphanumeric and other keys, is coupled to bus 1702 for communicating information and command selections to hardware processor 1704. Another type of user input device is cursor control 1716, such as, for example, a mouse, a trackball, or cursor direction keys, for communicating direction information and command selections to hardware processor 1704 and for controlling cursor movement on display 1712. For example, his input device may have two degrees of freedom in two axes, a first axis (e.g., x) and a second axis (e.g., y), that allows the device to specify positions in a plane.

Computing device 1700 in response to hardware processor 1704 executing instructions contained in main memory 1706 can perform a computer-implemented operation of an above embodiment. Such instructions are read into main memory 1706 from another storage medium, such as storage system 1710. Execution of the instructions contained in main memory 1706 may cause hardware processor 1704 to perform a computer-implemented operation of an above embodiment. Hard-wired circuitry may be used in place of or in combination with instructions to perform a computer-implemented operation of an above embodiment.

The term "storage media" as used herein refers to any non-transitory media that store data or instructions that cause a machine to operate in a specific fashion. Such storage media may comprise non-volatile media (e.g., storage system 1710) or volatile media (e.g., main memory 1706). Non-volatile media includes, for example, read-only memory (e.g., EEPROM), flash memory (e.g., solid-state drives), magnetic storage devices (e.g., hard disk drives), and optical discs (e.g., CD-ROM). Volatile media includes, for example, random-access memory devices, dynamic random-access memory devices (e.g., DRAM) and static random-access memory devices (e.g., SRAM).

Storage media is distinct from but may be used in conjunction with transmission media. Transmission media participates in transferring information between storage media. For example, transmission media includes coaxial cables, copper wire and fiber optics, including the circuitry that comprise bus 1702. Transmission media can also take the form of acoustic or light waves, such as those generated during radio-wave and infra-red data communications.

Computing device 1700 also includes data communications network interface 1718 coupled to bus 1702. Network interface 1718 may provide a two-way data communication coupling to a wired or wireless network link 1720 that is connected to a local, cellular or mobile network 1722. For example, network interface 1718 may be IEEE 802.3 wired "ethernet" card, an IEEE 802.11 wireless local area network (WLAN) card, an IEEE 802.15 wireless personal area network (e.g., Bluetooth) card or a cellular network (e.g., GSM, LTE, etc.) card to provide a data communication connection to a compatible wired or wireless network. Network interface 1718 may send and receive electrical, electromagnetic or optical signals that carry digital data streams representing various types of information.

Network link 1720 provides data communication through one or more networks to other data devices. For example, network link 1720 may provide a persistent, periodic, or intermittent connection through network 1722 to local computing device 1724 that is also connected to network 1722 or to data communication equipment operated by a network access provider 1726 such as, for example, an internet service provider or a cellular network provider. Network access provider 1726 in turn may provide data communication connectivity to another data communications network 1728 (e.g., the Internet). Networks 1722 and 1728 both may use electrical, electromagnetic or optical signals that carry digital data streams. The signals through the various networks and the signals on network link 1720 and through network interface 1718, which carry the digital data to and from computing device 1700, are example forms of transmission media. Computing device 1700 may send messages and receives data, including program code, through the networks 1722 and 1728, network link 1720 and network interface 1718. In the Internet example, a networked computing device 1730 may transmit a requested code for an application program through network 1728, network 1722 and network interface 1718. The received code may be executed by hardware processor 1704 as it is received, or stored in storage device 1710, or other non-volatile storage for later execution.

Computing device 1700 is just one example of a possible computing device that may be used in an implementation of the invention. Other computing device configurations having more, fewer, or different components can be used according to the requirements of the particular implementation at hand.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

CONCLUSION

Unless the context clearly indicates otherwise, the term "or" is used in the foregoing specification and in the appended claims in its inclusive sense (and not in its exclusive sense) so that when used, for example, to connect a list of elements, the term "or" means one, some, or all of the elements in the list.

Unless the context clearly indicates otherwise, the terms "comprising," "including," "having," "based on," "encompassing," and the like are used in the foregoing specification and in the appended claims in an open-ended fashion, and do not exclude additional elements, features, acts, or operations.

Unless the context clearly indicates otherwise, conjunctive language such as the phrase "at least one of X, Y and Z," is to be understood to convey that an item, term, etc. may be either X, Y or Z, or a combination thereof. Thus, such conjunctive language is not intended to imply that certain embodiments require at least one of X, at least one of Y and at least one of Z to each be present.

Unless the context clearly indicates otherwise, as used in the foregoing detailed description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, these elements should not be limited by these terms. These terms are only used to distinguish one element from another. For example, a first computing device could be termed a second computing device, and, similarly, a second computing device could be termed a first computing device. The first computing device and the second computing device are both computing devices, but they are not the same computing device.

Unless the context clearly indicates otherwise, in the foregoing detailed description and in the appended claims, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Unless the context clearly indicates otherwise, although some of various drawings illustrate a number of logical stages in a particular order, stages that are not order dependent may be reordered and other stages may be combined or broken out. While some reordering or other groupings are specifically mentioned, the ordering and groupings presented herein are not an exhaustive list of alternatives.

The invention claimed is:

1. A method comprising:
   receiving, by a control system, a request to store a particular key-value item;
   sending a first request, by the control system, to a first networked distributed data storage system, that stores key-value items, to store the particular key-value item in association with a timestamp;
   based on determining, by the control system, that a predetermined time has elapsed with respect to the timestamp:
      retrieving a first set of key-value items from the first networked distributed data storage system, the first set of key-value items comprising the particular key-value item and other key-value items having timestamps within a time range that includes the timestamp, and
      sending a second request to a second networked distributed data storage system, that stores data objects, to store the first set of key-value items in a first set of one or more data objects, the first networked distributed data storage system having a lower average write latency than the second networked distributed data storage system.

2. The method of claim 1 wherein the first networked distributed data storage system has a higher average data storage cost than the second networked distributed data storage system.

3. The method of claim 1, wherein the particular key-value item has a particular key; and wherein the method further comprises:
   receiving, by the control system, a request to read the particular key;
   identifying, by the control system, a particular data object at the second networked distributed data storage system that is associated with the particular key; and
   receiving, by the control system, a value for the particular key based on requesting the second networked distributed data storage system to access the particular data object.

4. The method of claim 1, wherein:
   the retrieving the first set of key-value items from the first networked distributed data storage system is based on requesting, by the control system, the first networked distributed data storage system to select key-value items stored in the first networked distributed data storage system for inclusion in the first set of key-value items based on the time range; and
   the method further comprises sending a third request, by the control system, to the first networked distributed data storage system to store an association between the time range and the first set of one or more data objects.

5. The method of claim 1, wherein:
   the request to store the particular key-value item is received at a particular node of the control system;
   the control system comprises a plurality of nodes that includes the particular node;
   the plurality of nodes of the control system comprises a set of respective system clocks;
   the plurality of nodes of the control system are configured to synchronize the set of respective system clocks within a clock skew tolerance;
   the sending the first request to the first networked distributed data storage system to store the particular key-value item includes requesting, in the first request, the first networked distributed data storage system to store an association between the particular key-value item and a first system clock time;
   the method further comprises:
      obtaining, by the particular node, the first system clock time from a respective system clock of the set of respective system clocks, and
      upon detecting, by the particular node, the requesting the first networked distributed data storage system to store the particular key-value item having timed out:
         obtaining, by the particular node, a second system clock time from the respective system clock, and
         sending a third request, by the particular node, to the first networked distributed data storage system to store the particular key-value item and an association between the particular key-value item and the second system clock time.

6. The method of claim 1, wherein the particular key-value item has a particular key; and wherein the method further comprises:
   receiving, by the control system, a request to read the particular key, the particular key composed of or associated in the request with timing information;
   using, by the control system, the timing information to identify the first set of one or more data objects stored in the second networked distributed data storage system; and
   receiving, by the control system, a value for the particular key based on requesting, by the control system, the second networked distributed data storage system to access at least one of the first set of one or more data objects.

7. The method of claim 1, further comprising:
   storing, by the control system, a minimum value and a maximum value in association with a key range;
   receiving, by the control system, a query for key-value items, the query specifying a filter predicate, the filter predicate specifying a particular value;
   determining, by the control system, that the particular value is between the minimum value and the maximum value;
   using, by the control system, the key range to identify a second set of data objects stored in the second networked distributed data storage system; and
   receiving, by the control system, a third set of key-value pairs satisfying the query based on requesting, by the control system, the second networked distributed data storage system to access at least one of the second set of data objects.

8. A computing system comprising:
   one or more processors;
   storage media; and
   instructions stored in the storage media which, when executed by the computing system, cause the computing system to perform:

receiving a request to store a particular key-value item;
sending a first request to a key-value data storage system, that stores key-value items, to store the particular key-value item in association with a timestamp;
based on determining that a predetermined time has elapsed with respect to the timestamp:
retrieving a first set of key-value items from the key-value data storage system, the first set of key-value items comprising the particular key-value item and other key-value items having timestamps within a time range that includes the timestamp, and
sending a second request to a data object storage system, that stores data objects, to store the first set of key-value items in a first set of one or more data objects, the key-value data storage system having a lower average write latency than the data object storage system.

9. The computing system of claim 8, wherein the key-value data storage system has a higher average data storage cost than the data object storage system.

10. The computing system of claim 8, wherein the particular key-value item has a particular key; and wherein the computing system further comprises instructions which, when executed by the computing system, cause the computing system to perform:
receiving a request to read the particular key;
identifying a particular data object at the data object storage system that is associated with the particular key; and
receiving a value for the particular key based on requesting the data object storage system to access the particular data object.

11. The computing system of claim 8, wherein:
the retrieving the first set of key-value items from the key-value data storage system is based on requesting the key-value data storage system to select key-value items stored in the key-value data storage system for inclusion in the first set of key-value items based on the time range; and
the computing system further comprises instructions which, when executed by the computing system, cause the computing system to perform sending a third request to the key-value data storage system to store an association between the time range and the first set of one or more data objects.

12. The computing system of claim 8, wherein:
the request to store the particular key-value item is received at a particular node of the computing system;
the computing system further comprises a plurality of nodes that includes the particular node;
the plurality of nodes of the computing system comprises a set of respective system clocks;
the plurality of nodes of the computing system are configured to synchronize the set of respective system clocks within a clock skew tolerance;
the sending the first request to the key-value data storage system to store the particular key-value item includes requesting, in the first request, the key-value data storage system to store an association between the particular key-value item and a first system clock time;
the computing system further comprises instructions which, when executed by the computing system, cause the computing system to perform:
obtaining, by the particular node, the first system clock time from a respective system clock of the set of respective system clocks, and
upon detecting, by the particular node, the requesting the key-value data storage system to store the particular key-value item having timed out:
obtaining, by the particular node, a second system clock time from the respective system clock, and
sending a third request, by the particular node, to the key-value data storage system to store the particular key-value item and an association between the particular key-value item and the second system clock time.

13. The computing system of claim 8, wherein the particular key-value item has a particular key; and the computing system further comprising instructions which, when executed by the computing system, cause the computing system to perform:
receiving a request to read the particular key, the particular key composed of or associated in the request with timing information;
using the timing information to identify the first set of one or more data objects stored in the data object storage system; and
receiving a value for the particular key based on requesting the data object storage system to access at least one of the first set of one or more data objects.

14. The computing system of claim 8, further comprising instructions which, when executed by the computing system, cause the computing system to perform:
storing a minimum value and a maximum value in association with a key range;
receiving a query for key-value items, the query specifying a filter predicate, the filter predicate specifying a particular value;
determining that the particular value is between the minimum value and the maximum value;
using the key range to identify a second set of data objects stored in the data object storage system; and
receiving a third set of key-value pairs satisfying the query based on requesting the data object storage system to access at least one of the second set of data objects.

15. One or more non-transitory storage media storing instructions which, when executed by a computing system having one or more processors, cause the computing system to perform:
receiving a request to store a first key-value item, the first key-value item having a key and a value;
determining a first ordering stamp based on a system clock of the computing system;
adding the first ordering stamp to the key of the first key-value item; and
sending a first request to a first networked distributed data storage system, that stores key-value items, to store the first key-value item with the first ordering stamp added to the key of the first key-value item;
based on determining that a predetermined time has elapsed with respect to the first ordering stamp:
retrieving a first set of key-value items from the first networked distributed data storage system, the first set of key-value items comprising the first key-value item and other key-value items having ordering stamps within a time range that includes the first ordering stamp, and
sending a second request to a second networked distributed data storage system, that stores data objects, to store the first set of key-value items in a first set of one or more data objects, the first networked distributed data storage system having lower average write latency than the second networked distributed data storage system.

16. The one or more non-transitory storage media of claim 15, wherein the first ordering stamp comprises a timestamp-based value; and wherein the determining the first ordering stamp based on the system clock of the computing system is based on:
  obtaining a current timestamp from the system clock; and
  determining the timestamp-based value as a maximum of:
    (a) the current timestamp obtained from the system clock, and (b) a last assigned timestamp-based value plus an increment.

17. The one or more non-transitory storage media of claim 15, wherein the first ordering stamp further comprises a unique identifier assigned to the computing system.

18. The one or more non-transitory storage media of claim 15,
  receiving a request to store a second key-value item, the second key-value item having a key and a value;
  determining a second ordering stamp based on the system clock of the computing system;
  adding the second ordering stamp to the key of the second key-value item;
  sending a second request to a first networked distributed data storage system, that stores key-value items, to store the second key-value item with the second ordering stamp added to the key of the second key-value item.

* * * * *